United States Patent
Zee et al.

(10) Patent No.: US 10,893,405 B2
(45) Date of Patent: Jan. 12, 2021

(54) NETWORK NODES AND METHODS PERFORMED THEREIN FOR ENABLING COMMUNICATION IN A COMMUNICATION NETWORK

(71) Applicant: Telefonaktiebolaget LM Ericsson (publ), Stockholm (SE)

(72) Inventors: Oscar Zee, Stockholm (SE); Paul Schliwa-Bertling, Ljungsbro (SE); Angelo Centonza, Stockholm (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 16/074,044

(22) PCT Filed: Feb. 12, 2016

(86) PCT No.: PCT/SE2016/050107
§ 371 (c)(1),
(2) Date: Jul. 30, 2018

(87) PCT Pub. No.: WO2017/135860
PCT Pub. Date: Aug. 10, 2017

(65) Prior Publication Data
US 2019/0045351 A1 Feb. 7, 2019

Related U.S. Application Data

(60) Provisional application No. 62/291,572, filed on Feb. 5, 2016.

(51) Int. Cl.
*H04W 8/06* (2009.01)
*H04W 48/18* (2009.01)
(Continued)

(52) U.S. Cl.
CPC ............. *H04W 8/06* (2013.01); *H04W 48/18* (2013.01); *H04W 76/11* (2018.02); *H04W 76/16* (2018.02)

(58) Field of Classification Search
CPC ..................................................... H04W 48/18
See application file for complete search history.

(56) References Cited

U.S. PATENT DOCUMENTS

2016/0353465 A1* 12/2016 Vrzic ..................... H04W 12/06
2017/0070892 A1* 3/2017 Song ...................... H04L 41/042
(Continued)

OTHER PUBLICATIONS

International Search Report and Written Opinion for Application No. PCT/SE2016/050107, dated Oct. 11, 2016, 10 pages.
(Continued)

*Primary Examiner* — Hassan Kizou
*Assistant Examiner* — Hector Reyes
(74) *Attorney, Agent, or Firm* — Sage Patent Group

(57) ABSTRACT

A method, performed by a RAN node, for enabling connection setup for a wireless device in a communication network comprising a first network which is a home network of the wireless device and a second network which is visited by the wireless device. The networks each comprise partitioned sets of functionalities, which sets of functionalities each belong to a network slice of the network, wherein a first set of functionalities in the first network belongs to a first network slice supporting the wireless device. The RAN node receives a first network identity for the home network, an identity of the first network slice supporting the wireless device in the home network and a second network identity for the second network, from the wireless device, to retrieve an identity of a second network slice capable of supporting the wireless device in the second network to determine a second core network node.

9 Claims, 18 Drawing Sheets

(51) Int. Cl.
*H04W 76/11* (2018.01)
*H04W 76/16* (2018.01)

(56) References Cited

U.S. PATENT DOCUMENTS

| | | | | |
|---|---|---|---|---|
| 2017/0164349 | A1* | 6/2017 | Zhu | H04W 72/048 |
| 2018/0262979 | A1* | 9/2018 | Wang | H04W 48/18 |
| 2018/0376412 | A1* | 12/2018 | Bischinger | H04W 8/08 |
| 2019/0021047 | A1* | 1/2019 | Zong | H04W 76/11 |

OTHER PUBLICATIONS

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Sep. 2015, 334 pages, V13.4.0, 3GPP Organizational Partners.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 2015, 254 pages, V13.1.0, 3GPP Organizational Partners.

"Update the network slicing use case in SMARTER," Aug. 17-21, 2015, 3 pages, 3GPP TSG-SA WG1 Meeting #71, S1-152074, ZTE Corporation, Belgrade, Serbia.

"A Deliverable by the NGMN Alliance, NGMN 5G White Paper," Feb. 17, 2015, 125 pages, Next Generation Mobile Networks Ltd.

* cited by examiner

NETWORK NODES AND METHODS PERFORMED THEREIN FOR ENABLING COMMUNICATION IN A COMMUNICATION NETWORK

CROSS-REFERENCE TO RELATED APPLICATIONS

This application is a National stage of International Application No. PCT/SE2016/050107, filed Feb. 12, 2016, which claims priority to U.S. Application No. 62/291,572, filed Feb. 5, 2016, which are all hereby incorporated by reference.

TECHNICAL FIELD

Embodiments herein relate to a Radio Access Network, RAN, node, a core network node, a wireless device and methods performed therein for communication. Furthermore, a computer program and a computer readable storage medium are also provided herein. In particular, embodiments herein relate to enabling connection setup for a wireless device in a communication network.

BACKGROUND

In a typical communication network, wireless devices, also known as wireless communication devices, mobile stations, stations (STA) and/or user equipments (UE), communicate via a Radio Access Network (RAN) to one or more Core Networks (CN). The RAN covers a geographical area which is divided into service areas or cell areas, with each service area or cell area being served by a radio network node such as a radio access node e.g., a Wi-Fi access point or a Radio Base Station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

FIG. 3 shows a management system architecture in the communications network. The node elements (NE), also referred to as eNodeB, are managed by a domain manager (DM), also referred to as the operation and support system (OSS). A DM may further be managed by a network manager (NM). Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM.

By means of configuration via the DM, NM and related interfaces, functions over the X2 and S1 interfaces can be carried out in a coordinated way throughout the RAN, eventually involving the Core Network, i.e. MMEs and S-GWs.

The S1-MME interface is used for control plane between eNodeB/E-UTRAN and MME. The main protocols used in this interface are S1 Application Protocol (S1AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.

UE Context Management functionality such as Initial Context Setup Function and UE Context Modification Function.

E-UTRAN Radio Access Bearer (E-RAB) Service Management functions e.g. Setup, Modify, Release.

Mobility Functions for wireless devices in EPS Connection Management (ECM)-CONNECTED, e.g. Intra-LTE Handover and inter-3GPP-Radio Access Technology (RAT) Handover.

S1 Paging function.

Non Access Stratum (NAS) Signaling Transport function.

Establishment of the S1-MME interface on S1AP protocol level is shown in FIG. 4 as the S1 setup procedure. The purpose of the S1 Setup procedure is to exchange application level data needed for the radio network node, such as an eNB, and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 5. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. Current assumption is that the RAN-CN split is similar for 5G as for 4G, implying an (evolved) S1 interface. An INITIAL CONTEXT SETUP RESPONSE message is sent by eNB to the MME confirming the setup.

The S1 setup procedure between the eNB and the MME according to existing standards is shown in FIG. 6.

When provisioning the eNB, the RAN operator will provide a Tracking Area Identity (TAI) for each cell within the eNB. The TAI consists of a network ID, such as a Public Land Mobile Network IDentifier (PLMN-ID) and a Tracking Area Code (TAC). The Tracking Area is a logical concept of an area covered by a core network node, such as the MME. For each cell within the eNB, the TAC is the same for all PLMNs, i.e. that the TAIs in one cell share the same TAC.

During initialization of an eNB, the eNB will make a query to a Domain Name System (DNS) on all its TAI:s. For query on each TAI, the DNS will return one or several core network node, such as MME, IP addresses. After the query procedure, the eNB will setup a Stream Control Transmission Protocol (SCTP) connection towards each MME IP address received from the DNS.

For each SCTP connection, which corresponds to a MME instance, the eNB will initiate a S1 setup procedure by sending the S1 SETUP REQUEST message, with a list of TACs with the corresponding Broadcast PLMN (B-PLMN) lists as parameters. The MME instance will respond with a S1 SETUP RESPONSE message with a list of the serving PLMN-IDs, which may also be referred to as S-PLMN IDs, a list of Served MME Group IDs, and a list of Served MME Codes (MMEC) as parameters. The eNB will use these lists for routing service requests from the UE to the correct MME instance.

The UE may request service to the network by performing an initial attach procedure. The beginning of the initial attach procedure, until initial UE message is transmitted to the correct MME is shown in FIG. 7.

When the UE is switched on, it selects and attempts to perform a Location Registration, which may also be referred to as an Attach procedure on the registered PLMN, if the UE has already been attached to the PLMN. If the UE has been out of coverage recovery from lack of coverage, the UE selects the registered PLMN, if a registered PLMN exists, and, if necessary attempts to perform a Location Registration.

In case the UE has no registered PLMN, or if registration is not possible due to the PLMN being unavailable or due to a registration failure, the UE follows either manual network selection, or automatic network selection. In Automatic Network Selection, the UE selects and attempts registration on other PLMNs, if available and allowable, in all of its bands of operation in the following order:

1 The Home PLMN (HPLMN), if it has not been previously selected;
2 each Visited PLMN (V-PLMN) in a "PLMN Selector" data field in the (U)SIM according to a priority order;
3 other PLMNs with received signal level above 85 dBm in random order;
4 all other PLMNs in order of decreasing signal strength.

Seen from network, the eNB is transmitting SystemInformationBlock1 (SIB1) on each cell, for example with PLMN-IDs (up to 6), TAC, Cell Identity and Closed Subscriber Group (CSG) related information.

Once the UE has selected a PLMN for Location Registration, it initiates a RRC connection Establishment Procedure. In the end of the procedure, the UE sends a RRCConnectionSetupComplete message to the eNB, including the PLMN-ID it has selected to attach to. The eNB will then use the PLMN-ID provided by the UE for selecting the corresponding MME, according to the information received during the S1 setup procedure from different MMEs. The eNB further forwards the initial NAS message, which in this case is an Attach Request, in a S1AP Initial UE Message to the MME. The initial NAS message is received from the UE piggybacked in the RRCConnectionSetupComplete message.

Within a LTE/EPC network, there are several identities which are used for distinguishing elements within the network. An overview of these identities is shown in FIG. 8.

The purpose of the Globally Unique Temporary UE Identity (GUTI) is to provide an unambiguous identification of the UE that does not reveal the UE or the user's permanent identity in the Evolved Packet System (EPS). The GUTI also allows the identification of the MME and the network. It can be used by the network and the UE to establish the UE's identity during signaling between the UE and the network in the EPS. The GUTI may have a length of 76 to 80 bits.

The GUTI comprises two main components:

The Globally Unique MME Identifier (GUMMEI) that uniquely identifies the MME which allocated the GUTI; and a Temporary Mobile Subscriber Identity called M-TMSI that uniquely identifies the UE within the MME that allocated the GUTI.

Within the MME, the mobile is identified by the M-TMSI.

The GUMMEI may be constructed from a Mobile Country Code (MCC), a Mobile Network Code (MNC) and an MME Identifier (MMEI).

The MMEI is constructed from an MME Group ID (MMEGI) and an MME Code (MMEC).

The GUTI is constructed from the GUMMEI and the M-TMSI.

For paging purposes, the mobile is paged with an S-TMSI, which S-TMSI is constructed from the MMEC and the M-TMSI.

An operator will need to ensure that the MMEC is unique within the MME pool area and, if overlapping pool areas are in use, unique within the area of overlapping MME pools. If the MMEC is not unique within the MME pool, the transmission in the network might be directed to the wrong MME For the purpose of selecting a core network node to which a UE should be connected to in case a UE context is registered or attached in the serving core network, the UE may signal to the RAN, during a service request or paging response procedure, an S-TMSI or a GUMMEI. A detection of the right CN node may then be performed based on these parameters.

The GUTI supports subscriber identity confidentiality, and, in the shortened S-TMSI form, enables more efficient radio signalling procedures, e.g. during Paging and/or Service Request.

The format and size of the GUTI is therefore the following:

<GUTI>=<GUMMEI><M-TMSI>,
where
<GUMMEI>=<MCC><MNC><MME Identifier>
and where
<MME Identifier>=<MME Group ID><MME Code>.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

As expected by leading operators and vendors in Next Generation Mobile Networks (NGMN) association, diverse applications or services are expected to be provided by 5G networks. 5G will support countless emerging use cases with a high variety of applications and variability of their performance attributes: from delay-sensitive video applications to ultra-low latency, from high speed entertainment applications in a vehicle to mobility on demand for connected objects, and from best effort applications to reliable and ultra-reliable ones such as health and safety. Furthermore, use cases will be delivered across a wide range of devices, e.g., smartphones, wearables, MTCs, and across a fully heterogeneous environment.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing and network sharing that is described herein.

Network slicing is about creating logically separated partitions of the network, which may also be referred to as slices or network slices, addressing different business purposes. These network slices are logically separated to a degree that they can be regarded and managed as networks of their own.

Network slicing is a new concept that applies to both LTE Evolution and New 5G RAT, which herein is referred to as NX. The key driver for introducing network slicing is business expansion, i.e. improving the operator's ability to serve other industries, by offering connectivity services with different network characteristics, such as e.g. performance, security, robustness, and/or complexity.

The current main working assumption is that there will be one shared RAN infrastructure that will connect to several EPC instances, where one EPC instance relates to a network slice. As the EPC functions are being virtualized, it is assumed that an operator will instantiate a new CN when a new slice should be supported.

RAN sharing is based on the possibility for operators to share the same RAN and optionally the same spectrum by means of two standardized architectures, which are shown in FIG. 9. The first architecture is called Mobile Operator Core Network (MOON) and consists of different participating operators to connect their CN infrastructure to a commonly shared RAN. In this case each participating operator can run CN-RAN procedures from its own managed RAN. A second architecture option is called Gateway Core Network (GWCN) and it consists of the shared RAN connecting to a single shared CN. Participating operators would therefore share the CN as well as the RAN.

The RAN may be managed by one of the participating operators or may be managed by a third party. It may also be possible that the CN infrastructure is managed by one of the participating operators or by a third party or it may be managed in part, i.e. for some nodes, by a third party and in part by the participating operator. Each participating operator has access to a set of resources both in the CN and in the RAN.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. Obviously, different use cases put different requirements to future networks. Examples of such requirements may include acceptable interruption time, reliability and availability, acceptable latency, data rate, as well as cost per user. It would be quite difficult or cost-wise impossible to deploy a common network service to fulfill such extremely diverse requirements. In the situation, network slicing was proposed as a concept to fulfill rich requirements from various 5G use cases. Meanwhile, the network slicing concept is getting widely recognition in NGMN. A network slice supports the communication service of a particular connection type with a specific way of handling C-plane and U-plane for the service. A 5G slice could be composed by a collection of 5G network functions and possibly specific RAT with specific settings that are combined together for the specific use case or business model. It should be noted that not all slices contain the same network functions. A specific network service can be instantiated according to on demand requirements for third party users/operators and the business policy between the network service providers and network the service consumers. Thus, an operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator services and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
    Evolved communication services
    Cloud services
    Extended mobility and coverage
Mission critical Machine Type Communication
    Intelligent traffic systems
    Smart grid
    Industrial applications
Massive Machine Type Communication
    Sensors/actuators
    Capillary networks
Media
    Efficient on-demand media delivery
    Media awareness
    Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of Enterprise services
Government services, e.g. national and/or public safety
Verticals industries, e.g. automation, transportation
Residential users These different users and services are also expected to put new requirements on the network. FIG. 10 shows an example of a network slicing for a case when there exists different network slices in the core network for MBB, Massive MTC and Critical MTC. In other words, the network slices may comprise separate core network instances supporting the different network slices. In addition, it is also possible that parts of the EPC are shared between the different network slices. One such example of shared EPC functionality may be MME.

Network service provision to wireless devices roaming out of home Public Land Mobile Network (PLMN) network has been supported over 3G and 4G. It will be no exception for 5G network. For roaming wireless devices, the network slice may be provided by Visited PLMN (VPLMN) totally in local breakout way, or joint provided by Home PLMN (HPLMN) and VPLMN in a home routed way, or even it could be provided by HPLMN totally and a CN of VPLMN is totally bypassed. From practical business perspective, due to resource restriction or business limitation, it is possible that certain types of network slices are not available in certain areas. In a different area or different operators, different network slice services are provided. It is highly possible that the network slice types provided by HPLMN and those provided by VPLMN may be different due to different business strategy. The specific network slice to be used for the roaming wireless device needs the involvement of both HPLMN and VPLMN, and it is more complex compared to a non-roaming situation.

At the same time, inspired by the great success of the cloud technology; the telecom industry is considering providing cloud based network service by NFV initiative at ETSI. As stated above NFV will transform the way that networks are built and operated by leveraging standard virtualization technology and consolidating network equipment types onto "industry standard" servers. The NFV technology will make it more flexible and efficient to provide and operate the virtual mobile network service, as well as value added service with low CAPEX and Operating Expenditures (OPEX) and reduced time to market. With the quick developing of cloud computing and NFV technology, it can be expected that more and more 5G network service will be deployed in cloud environment in the form of various network slices for agile operation and scale in context of dynamic user requirement.

Based on current NFV and Software Defined Networking (SDN) technology trend, it can be expected that 5G network service will be deployed over cloud infrastructure. In cloud environment, it is highly possible that a specific network slice is dynamically instantiated/terminated or scaled out/in to support flexible business model and efficient resource utilization. The network slice service provided by a network operator is more dynamic compared to traditional network service. For roaming users, the network slice selection involves both HPLMN and VPLMN. Therefore, one important issue is how to coordinate the strategy of both PLMNs and Network slice provision status of both PLMNs, as well as user preference during network slice selection process for the roaming user. Another related issue is the routing approach, e.g. home routed or local breakout, how to determine the appropriate routing approach for roaming users in context of cloud network environment with richer and dynamic network slice capability, capability difference between HPLMN and VPLMN and diverse user requirement.

For example, a user is roaming to a new area, in case the wireless device doesn't know the available network slice type in an area, it may select a specific network slice type/ID based on its preference. While, when the specific network slice is terminated, or out of service or overloaded, once the wireless device sets up a network connection and indicates the specific network slice type to an access network, it is highly possible that wireless device would be rejected, which would result in a negative user experience and performance of the communication network and additional signaling overhead may be required.

A RAN in a sliced network may be implemented with the following pre-requisites:

A RAN operator manages a number of eNBs and has it in its own transport network in the RAN.

The RAN operator, CN operators and other participating parties in the shared system have mutual Service Level Agreements (SLA)

The shared network supports a number of coexisting network slices, wherein each slice is served by part of the overall RAN/CN infrastructure. Each MME in the CN can handle one or several slices. The maximum number of MMEs which can be addressed within a CN operator will be 256 as long as 8-bits MMEC is used.

The aim of the network slicing is to provide a simple tool for cellular operators to introduce new services and features to different industries. It is therefore desired that the deployment of slices should be easy and with minimum coordination between RAN operator, CN operators (PLMNs) and other participating parties such as e.g. network slice operators. An example of objects for which high coordination is currently required between networks is e.g. MME addressing and slice identification.

Due to the highly increased number of virtualized networks sharing the infrastructure of the communications network the capacity of the infrastructure might soon reach its limit. Furthermore, the increased number of parties, such as network operators and/or infrastructure owners, cooperating in the communications network, leads to an increased effort for coordinating different identifiers between the virtualized networks within the communications network in order to avoid wrongful routing of transmissions between the different network entities, such as network nodes and/or network slices. Such coordination is both time consuming and cost intensive for all parties involved.

SUMMARY

An object of embodiments herein is to provide a mechanism for improving capacity and reducing the coordination effort of the communication network in an efficient manner.

According to an aspect the object is achieved by a method, performed by a Radio Access Network (RAN) node, for enabling connection setup for a wireless device in a communication network. The communication network comprises a first network and a second network. The first network is a home network of the wireless device and the second network is a network which is visited by the wireless device. The first and the second network each comprise partitioned sets of functionalities, which sets of functionalities each belong to a network slice of the network, wherein a first set of functionalities in the first network belongs to a first network slice supporting the wireless device. The first set of functionalities is separated from another set of functionalities out of a total set of functionalities in the first network. The wireless device is roaming from the first network to the second network. The RAN node receives a first network identity for the home network, an identity of the first network slice supporting the wireless device in the home network and a second network identity for the second network, from the wireless device. The RAN node retrieves an identity of a second network slice capable of supporting the wireless device in the second network, based on the received first network identity, the first network slice identity and the second network identity. The RAN node determines a second core network node based on the second network identity and the retrieved second network slice identity. The RAN node transmits an initial setup message for the wireless device, which initial setup message comprises an indication of the second network identity and the identity of the second network slice capable of supporting the wireless device, to the determined second core network node.

According to another aspect the object is achieved by a method performed by a wireless device, for establishing a connection to a second network in a communication network. The communication network comprises a first network and the second network. The first network is a home network of the wireless device and the second network is a network which is visited by the wireless device. The first and the second network each comprise partitioned sets of functionalities, which sets of functionalities each belong to a network slice of the network. A first set of functionalities in the first network belongs to a first network slice supporting the wireless device in the first network. The first set of functionalities is separated from another set of functionalities out of a total set of functionalities in the first network. The wireless device transmits a first network identity for the home network of the wireless device, an identity of the first network slice supporting the wireless device in the home network and a second network identity for the visited second network, to the RAN node. The wireless device 10 is roaming from the first network to the second network.

According to another aspect the object is achieved by a method performed by a core network node, for enabling connection setup for a wireless device in a communication network. The communication network comprises at least a first network and a second network. The first and the second network each comprise partitioned sets of functionalities, which sets of functionalities each belong to a network slice of the network, and which sets of functionalities are separated from each other. The core network node receives a setup request message for establishing communication between the RAN node and the core network node, from the RAN node. The core network node transmits a setup response message comprising an indication of one or more networks served by the core network node and the network slices supported by each network served by the core network node, to the RAN node.

According to still another aspect the object is achieved by providing a Radio Access Network (RAN) node, for enabling connection setup for a wireless device in a communication network. The communication network comprises a first network and a second network. The first network is a home network of the wireless device and the second network is a network which is visited by the wireless device. The first and the second network each comprise partitioned sets of functionalities, which sets of functionalities each belong to a network slice of the network. A first set of functionalities in the first network belongs to a first network slice supporting the wireless device. The first set of functionalities is separated from another set of functionalities out of a total set of functionalities in the first network. The wireless device is roaming from the first network to the second network. The RAN node is configured to receive a first network identity for the home network, an identity of the first network slice supporting the wireless device in the home network and a second network identity for the second network from the wireless device. The RAN node is configured to retrieve an identity of a second network slice capable of supporting the wireless device in the second network, based on the received first network identity, the first network slice identity and the second network identity. The RAN node is further configured to determine a core network node based on the second network identity and the retrieved second network slice identity. The RAN node is further configured to transmit an initial setup message for the wireless device, which initial setup message comprises an indication of the second network identity and the identity of the second network slice capable of supporting the wireless device, to the determined core network node.

According to a further aspect the object is achieved by providing a core network node, for enabling connection setup for a wireless device in a communication network. The communication network comprises at least a first network and a second network, wherein the first and the second network each comprise partitioned sets of functionalities. The sets of functionalities each belong to a network slice of the network and the sets of functionalities are separated from each other. The core network node is configured to receive a setup request message for establishing communication between the RAN node and the core network node, from the RAN node. The core network node is further configured to transmit a setup response message comprising an indication of one or more networks served by the core network node and the network slices supported by each network served by the core network node, to the RAN node.

According to yet a further aspect the object is achieved by providing a wireless device, for establishing a connection to a second network in a communication network. The communication network comprises a first network and the second network. The first network is a home network of the wireless device and the second network is a network which is visited by the wireless device. The first and the second network each comprise partitioned sets of functionalities, which sets of functionalities each belong to a network slice of the network. A first set of functionalities in the first network belongs to a first network slice supporting the wireless device in the first network. The first set of functionalities is separated from another set of functionalities out of a total set of functionalities in the first network. The wireless device is configured to transmit a first network identity for the home network of the wireless device, an identity of the first network slice supporting the wireless device in the home network and a second network identity for the visited second network, to the RAN node.

It is furthermore provided herein a computer program comprising instructions, which, when executed on at least one processor, cause the at least one processor to carry out any of the methods above, as performed by the first network node or the second network node. It is additionally provided herein a computer-readable storage medium, having stored thereon a computer program comprising instructions which, when executed on at least one processor, cause the at least one processor to carry out the method according to any of the methods above, as performed by the first network node or the second network node.

Embodiments herein introduce an efficient manner of coordinating different identifiers between PLMNs when multiple PLMNs with slices are hosted in the same RAN. By introducing a network identity, such as a PLMN-ID, in different signaling procedures and using it jointly with a slice ID, the slice IDs do not have to be unique across different networks, such as e.g. PLMNs, which allows a reuse of slice ID values. Further, since Slice IDs do not need to be coordinated across different PLMNs cross-PLMN configurations can be minimized, thereby reducing the costs and the work load of running such networks. The embodiments also introduce an efficient way of mapping home network IDs and slices in the home network to slices in a visited network.

BRIEF DESCRIPTION OF THE DRAWINGS

Embodiments will now be described in more detail in relation to the enclosed drawings, in which.

DETAILED DESCRIPTION

Figure 11:
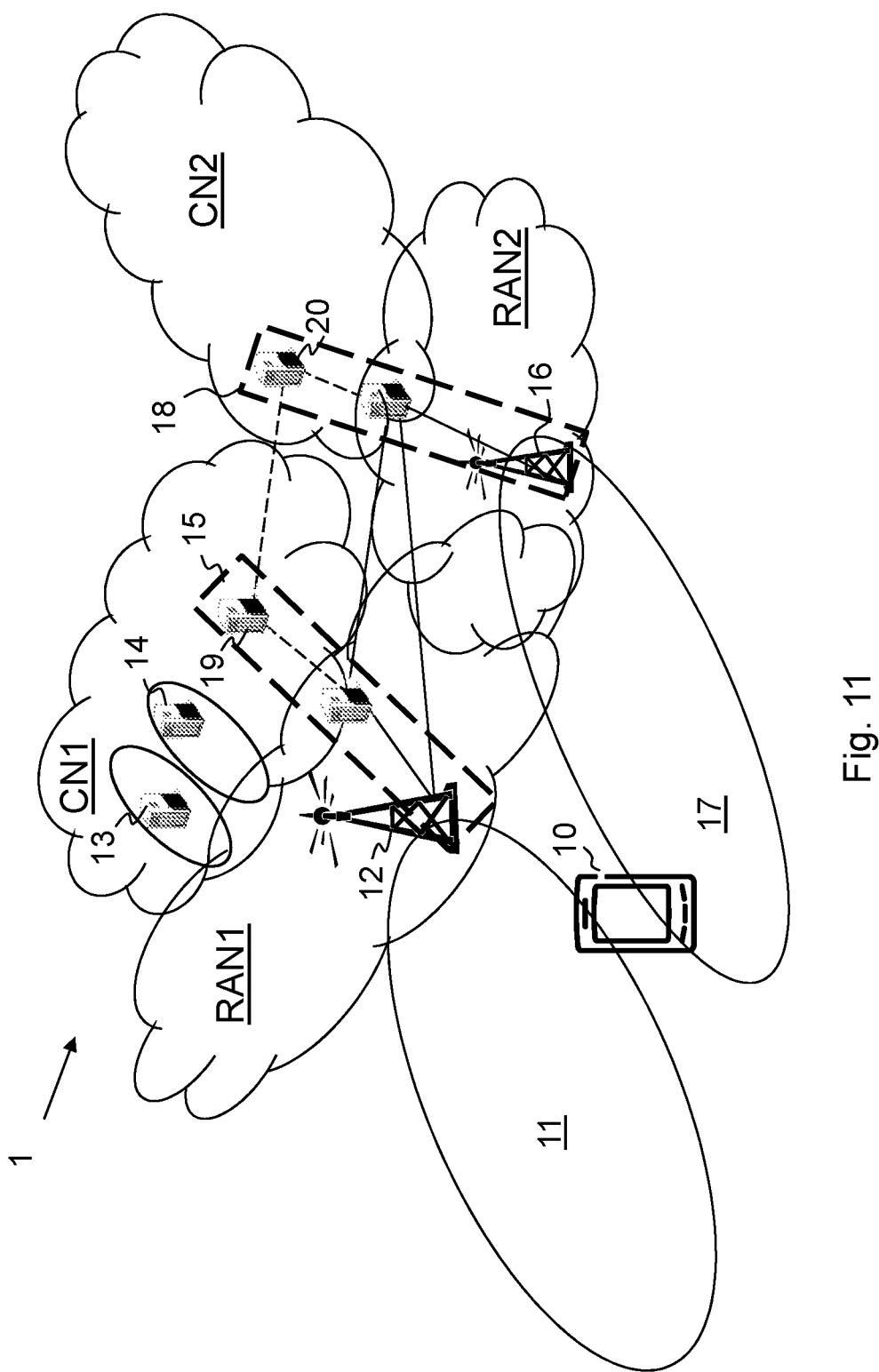
FIG. 11 is a schematic overview depicting a communication network according to embodiments herein.

Embodiments herein relate to communication networks in general. FIG. 11 is a schematic overview depicting a communication network 1. The communication network 1 comprises RANs and CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a User Equipment (UE) and/or a wireless terminals, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a first radio network node 12 providing radio coverage over a geographical area, a first service area 11, of a first radio access technology (RAT), such as LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio network node 12 depending e.g. on the first radio access technology and terminology used. The first radio network node 12 is comprised in a first radio access network (RAN1) of a first network.

Furthermore, the first network or home network comprises a first core network (CN1) also denoted home core network of the wireless device 10. The first network is a virtual network sliced into a number of network slices, the CN1 and/or the RAN1 may be a virtual network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a core network slice node or a RAN slice node. For example, a first network slice for e.g. MTC devices may comprise a first network slice node 13. A second network slice for e.g. MBB devices may comprise a second network slice node 14. Each network slice supports a set of functionalities out of a total set of functionalities in the communication network. E.g. the first network slice node 13 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MBB devices.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physically separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 13 supports the first set of functionalities out of the total set of functionalities in the first network of the communication network, which first set of functionalities belongs to the first network slice of the first network, and is separated from another set of functionalities out of the total set of functionalities in the first network.

The RAN1 and CN1 comprise one or more first network nodes 15, such as first core network nodes 19 e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. The first network node 15 may further be a radio access network node such as the first radio network node 12.

Furthermore, the communication network 1 comprises a second network or visited network comprising a second core network (CN2), also denoted as visited core network, and a second RAN, RAN2. Also this second network may be network sliced e.g. as the first network or differently. The communication network 1 further comprises a second radio network node 16 providing radio coverage over a geographical area, a second service area 17, of a second radio access technology (RAT), such as LTE, UMTS, Wi-Fi or similar. The second radio network node 16 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the second radio network node 16 depending e.g. on the second radio access technology and terminology used. The second radio network node 16 is comprised in the second radio access network, RAN2. The first and second RAT may be the same or different RATs.

The second network comprise one or more second network nodes 18, such as second core network nodes 20 e.g. Radio SDN nodes, MMEs, S-GWs, SGSNs, or corresponding nodes in e.g. a 5G network or similar. The second network node 18 may further be a radio access network node such as the second radio network node 16.

According to embodiments herein the wireless device 10 moves into the second service area 17 of the second radio network node 16. The wireless device initiates a connection establishment with a second network node 18, e.g. a RAN node associated with the second network, by performing a RRC Connection procedure. The Connection procedure comprises sending the selected PLMN-ID for the network which the wireless device 10 want to establish a connection to. If slicing is introduced the wireless device may further provide a slice ID of the slice it wishes to connect to. In a roaming scenario, such as e.g. when the wireless device is moving from a home network comprising the first network node 15 to a visited network comprising the second network nodes 18, the wireless device 10 will provide the slice ID from the home network upon connection establishment. The second network will however only be able to route the request to the correct CN node if the slice IDs are correlated between the home network and the visited network. However, this will require a lot of cross-PLMN configurations which are very time consuming and cost intensive.

Hence, embodiments herein provide an effective network slice selection for roaming wireless devices in the communication network that is simple and feasible from an implementation perspective, e.g. only is an enhancement on existing interfaces and network functions. This results in that less wireless devices are rejected during roaming and more are being served in the second network as served in the first network improving the performance of the communication network 1. Furthermore, the cross-PLMN configurations can be reduced which reduces the cost and effort of running the communication network 1. Hence, embodiments herein provide an effective manner to support network slice selection for roaming wireless devices.

Embodiments herein relate to minimizing the coordination of different identifiers, such as e.g. slice ID, between PLMNs when multiple PLMNs with slices are hosted in the same RAN. There are three main aspects of the embodiments herein.

The first aspect relates to introduction of a data structure in S1 SETUP procedure related messages, for example in S1 SETUP RESPONSE, where a slice ID can be defined individually between participating PLMNs in RAN. This is a pre-requisite for independency of slice ID between participating PLMNs in RAN.

The second aspect relates to introduction of a "slice lookup database" node, where a mapping between slice IDs for H-PLMN and V-PLMNs is introduced.

However, for the legacy UE, MMEC coordination between participating PLMNs in RAN is still needed. It can be solved by dividing the MMEC value range into two parts. The first part is used by MMEs which need to handle legacy UEs, where MMEC coordination is needed. Such MMEs can also serve non-legacy wireless devices. The second part is used by MMEs which only handle newer UEs where MMEC coordination between PLMN can be omitted.

The fact that MMECs do not need to be unique across different PLMNs allows the reuse of MMEC values, which implies that the MMEs in a network can use an overall number of MMECs higher than the current limit of 256. Also, the fact that MMECs and Slice IDs do not need to be coordinated across different PLMNs allows to minimize cross-PLMN configurations and therefore to save costs of running such networks. This minimized coordination will be very beneficial for deployment of slicing in RAN once it is introduced.

Figure 1:
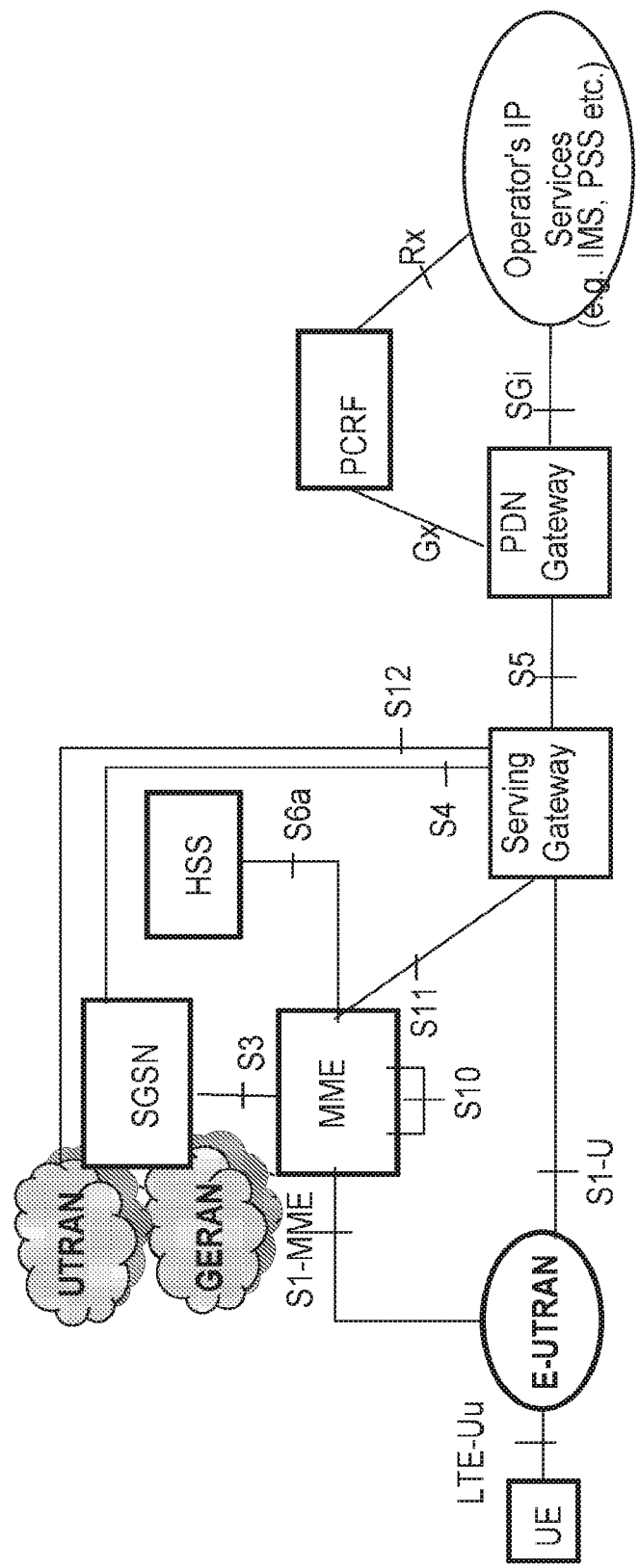
FIG. 1 is a schematic overview depicting a communication network according to prior art.
Figure 2:
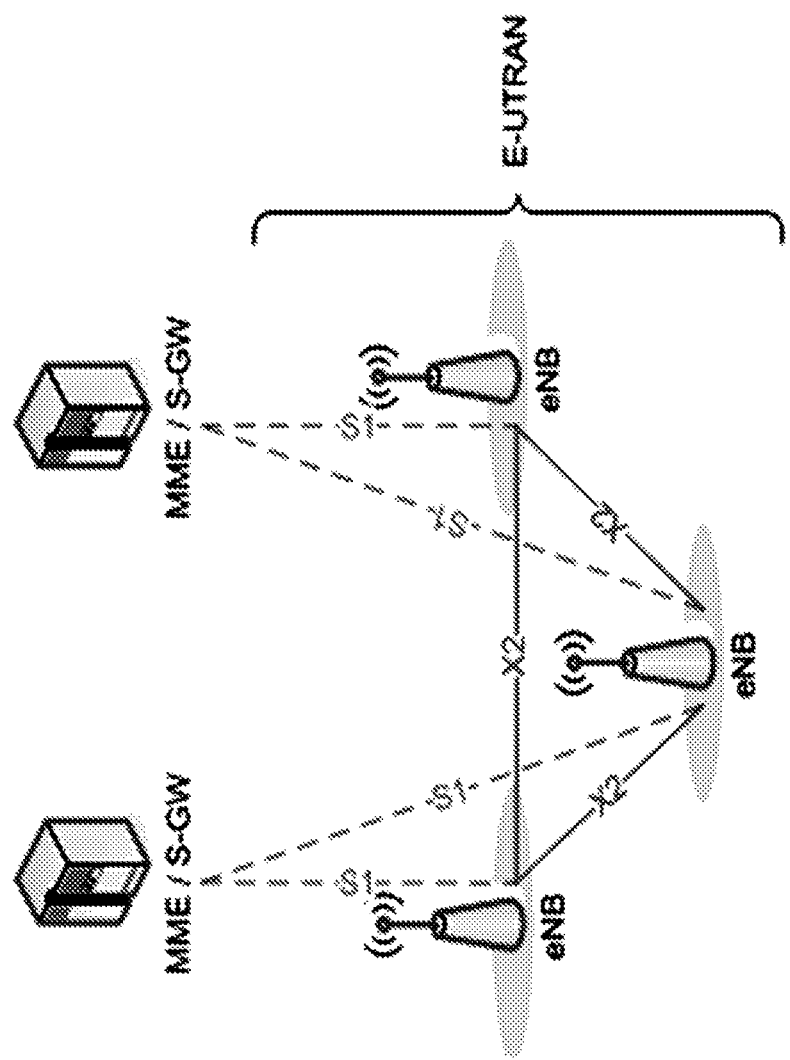
FIG. 2 is a schematic overview depicting a radio access network in connection with a core network.
Figure 3:
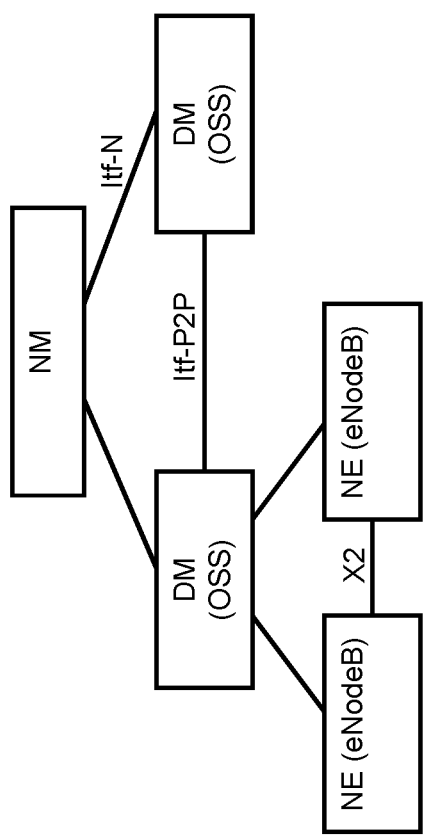
FIG. 3 is a schematic overview depicting a management system architecture for a communications network.
Figure 4:
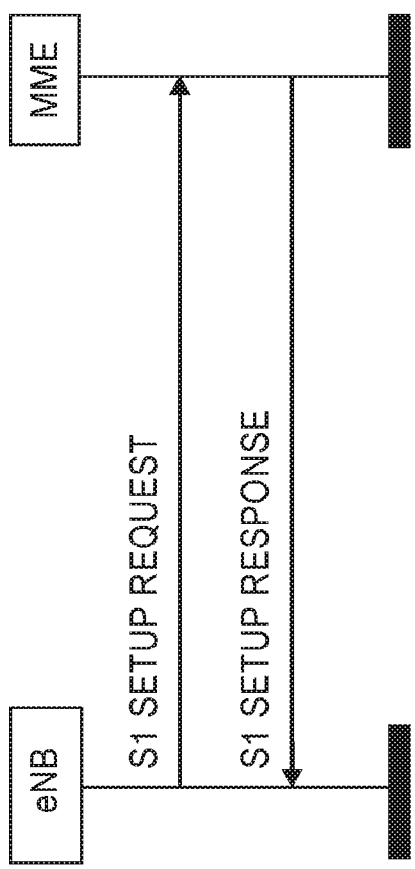
FIG. 4 is a signaling scheme according to prior art.
Figure 5:
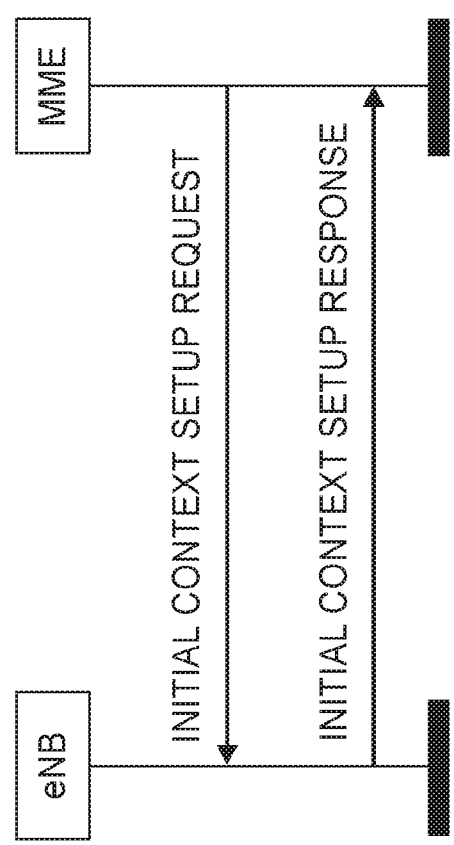
FIG. 5 is a signaling scheme according to prior art.
Figure 6:
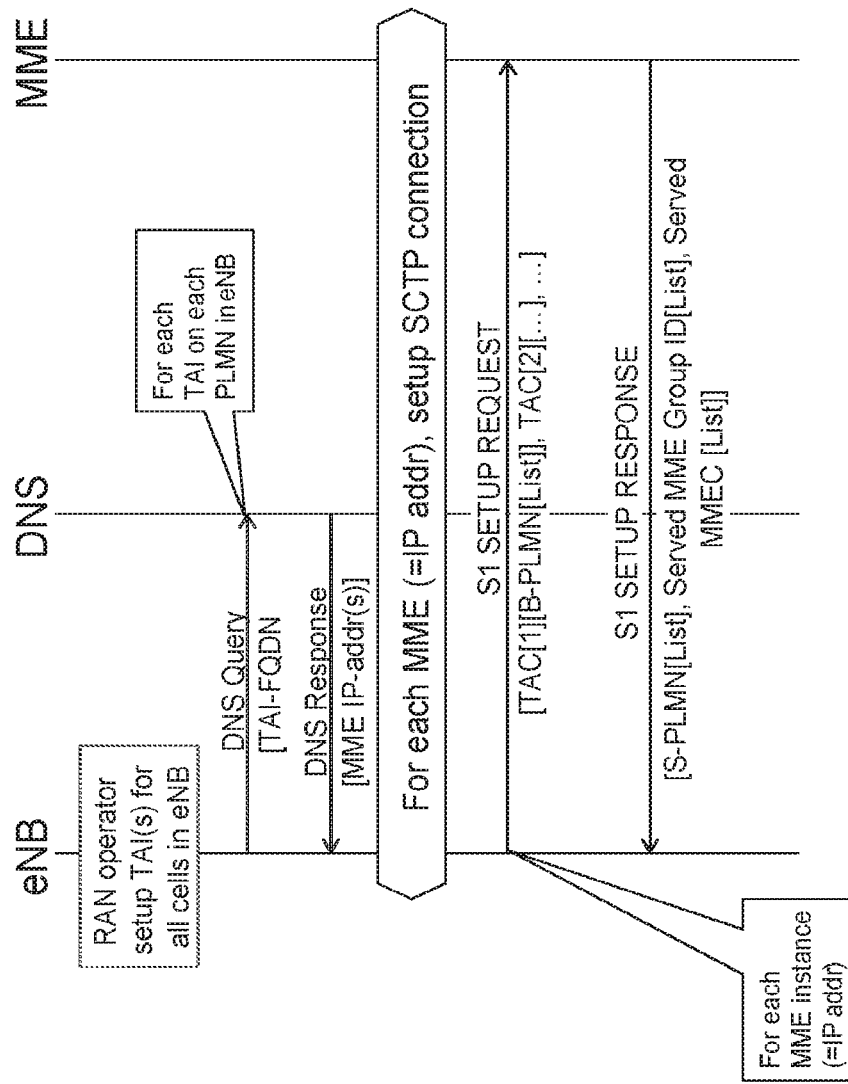
FIG. 6 is a signaling diagram depicting a S1 Setup procedure according to prior art.
Figure 7:
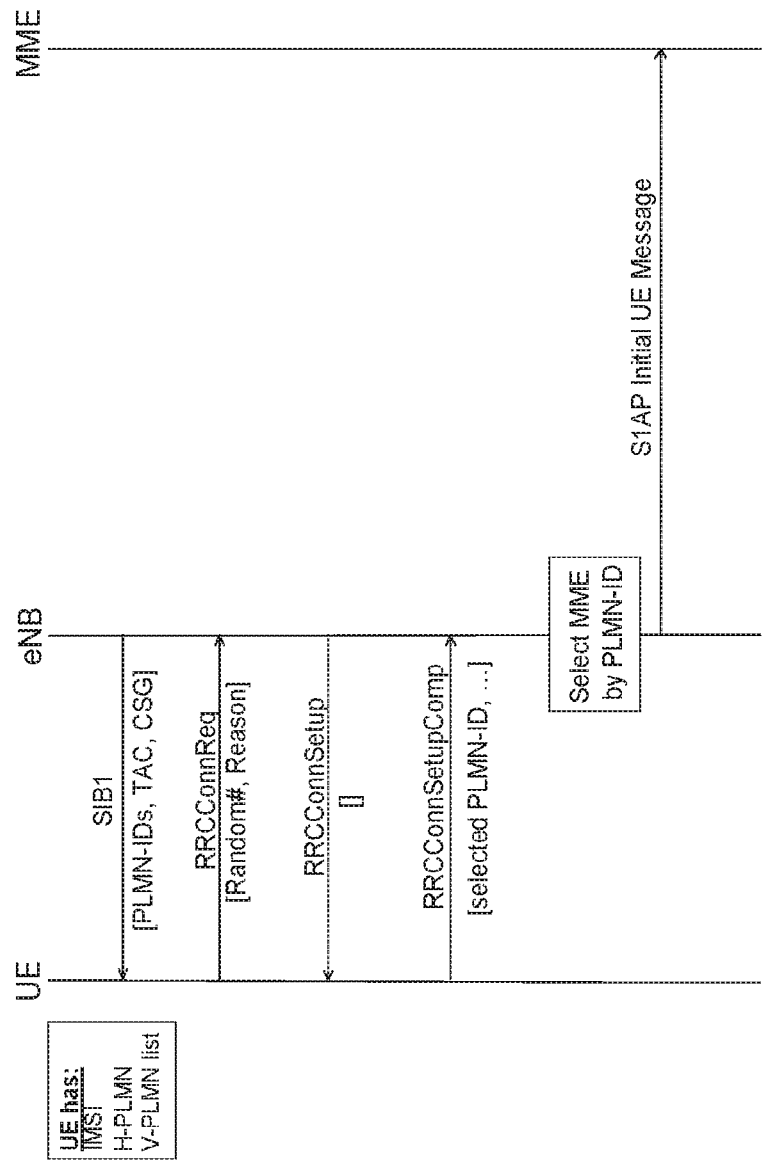
FIG. 7 signaling diagram depicting a service request procedure according to prior art.
Figure 8:
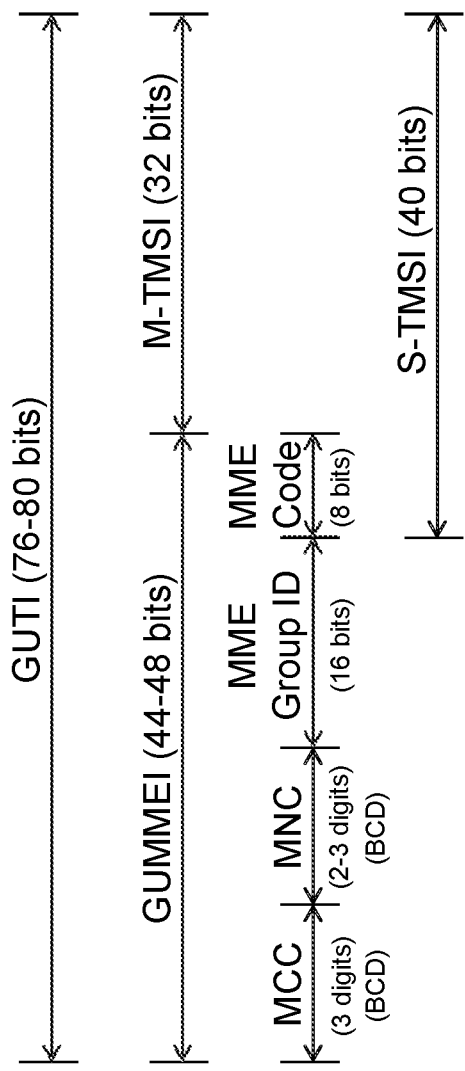
FIG. 8 is a schematic overview of identities used for distinguishing elements within the network.
Figure 9:
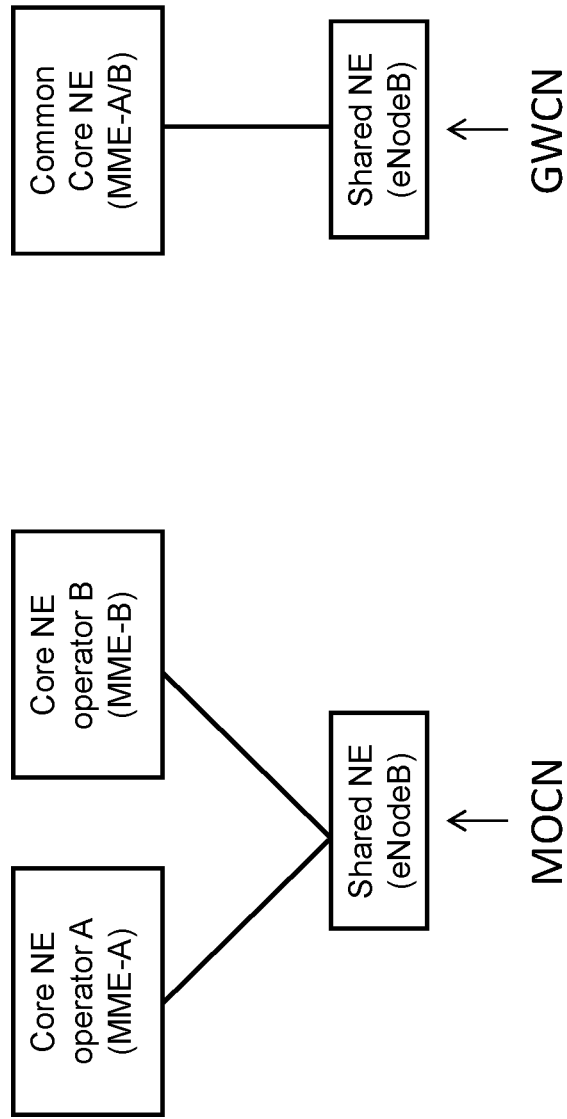
FIG. 9 is a schematic overview depicting examples of standardized architectures for sharing Radio Access Networks.
Figure 10:
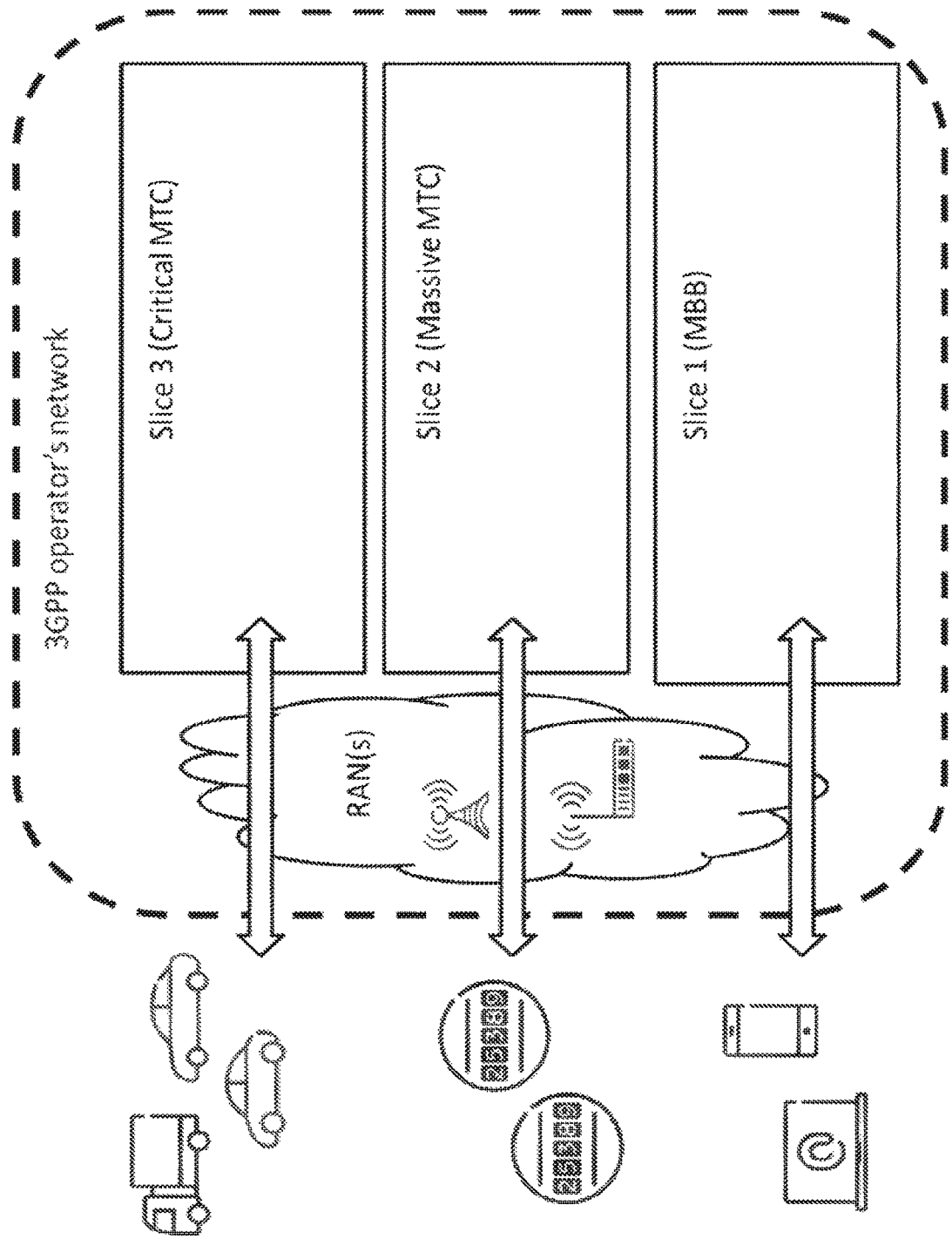
FIG. 10 is a schematic overview depicting an example of network slicing with slice specific core network instances according to prior art.
Figure 12:
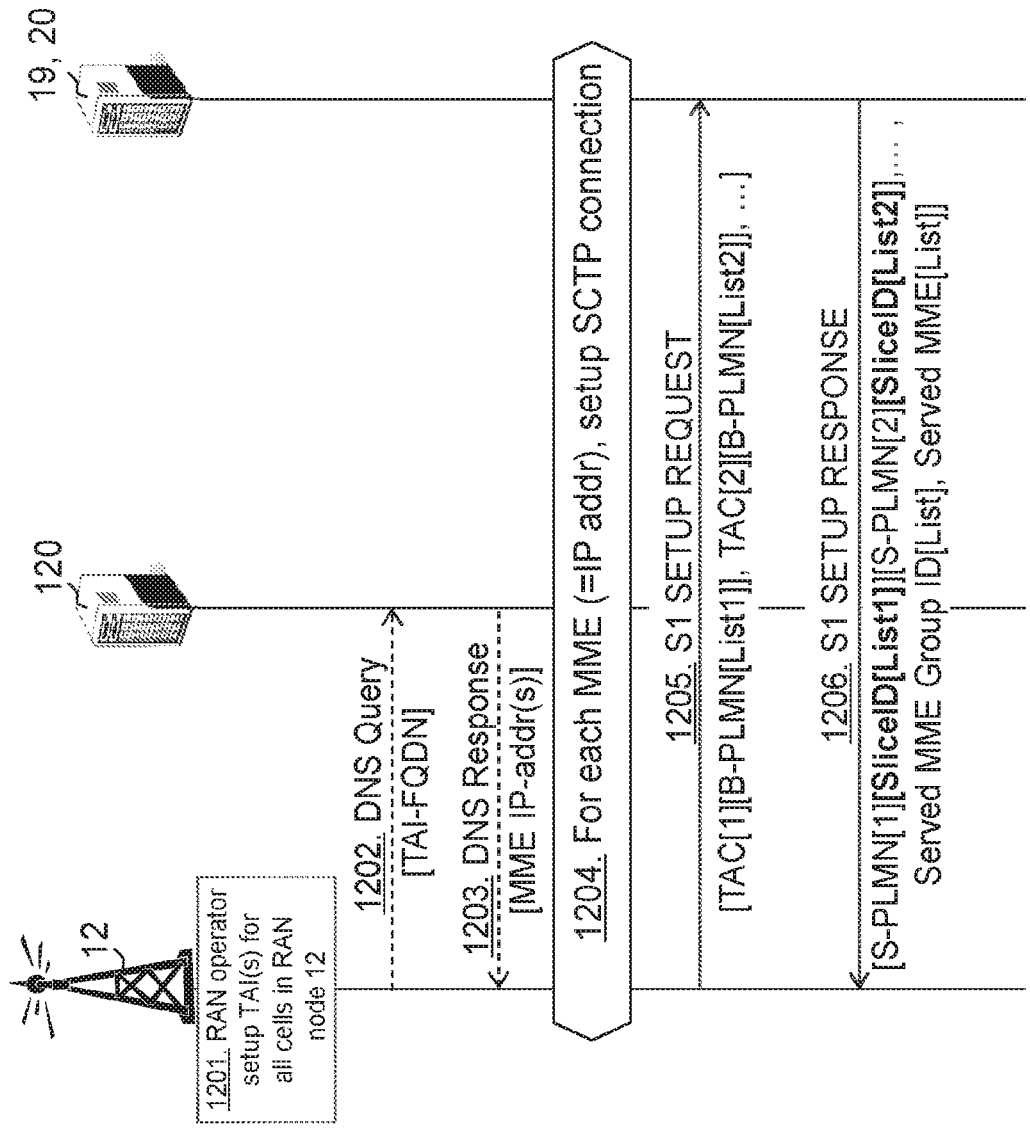
FIG. 12 is a signaling diagram depicting a S1 Setup procedure according to prior art.

FIG. 12 shows an enhanced S1 Setup procedure for PLMN-specific slices according to a first aspect of embodiments herein. The enhanced S1 Setup procedure comprises the following actions:

Action 1201:

As described previously for FIG. 6, when provisioning the RAN node 12, the operator of the RAN node 12 will provide a Tracking Area Identity (TAI) for each cell within the RAN node 12. The TAI consists of the network ID, such as the PLMN-ID, and a Tracking Area Code (TAC). For each cell within RAN node 12, it is required that the TAC is the same for all PLMNs, i.e. that the TAIs in one cell share the same TAC.

Action 1202:

During initialization of the RAN node 12, the RAN node 12 may transmit a DNS query comprising the TAI on each network on the RAN node 12 to a DNS server 120. The DNS query may be sent for TAI on each PLMN supported by the RAN node 12.

Action 1203:

The DNS server 120 may transmit a DNS Response to the RAN node 12 comprising Internet Protocol (IP) addresses, such as MME IP-addresses, of the core network nodes 19, 20 related to the TAI.

Action 1204:

The RAN node 12 may set up a Stream Control Transmission Protocol (SCTP) connection, which is used as a transport protocol for the S1 and X2 control interfaces, for each CN node IP-address received in the DNS response.

Action 1205:

The RAN node 12 initiates a S1 setup procedure by transmitting a S1 SETUP REQUEST message, with a list of TACs with corresponding Broadcast PLMN (B-PLMN) lists as parameters, for each of the SCTP connections, which correspond to a core network node instance.

Action 1206:

The core network node 19, 20 transmits a response to the RAN node 12 with a S1 SETUP RESPONSE message comprising a list of serving networks (S-PLMNs), which may be indicated with PLMN-IDs, a list of Served MME Group IDs, and a list of Served MME Codes (MMEC) indicating the served core network nodes, as parameters. The RAN node 12 uses these lists for routing a service request from a wireless device 10 to the correct core network node instance. In order for the RAN node 12 to be able to route the service request from the wireless device 10 to the correct network slice, the core network node further provides a list of slices supported for each S-PLMN.

The RAN node 12 supporting slicing is informed by the CN nodes 19, 20 connected to the RAN node 12 about the slices supported by each CN node 19, 20 and their identifiers, such as the slice ID. In a first scenario where multiple PLMNs are served by the same RAN and each PLMN supports multiple slices both in the RAN and in the CN, the RAN node receives a list of Slice IDs from the CN node 19, 20 for each PLMN supported by the CN node 19, 20. In the case of LTE, the eNB would receive in a list of PLMN IDs and for each PLMN ID in the list it would receive a list of Slice IDs supported by the PLMN. The list of PLMN IDs and the list of Slice IDs corresponding to each PLMN ID may be transmitted from the CN node 19, 20 to the eNB in the S1 SETUP RESPONSE. Thereby, once the eNB has been informed about the PLMN ID selected for a UE and once the eNB is informed about the slice ID for which a UE wants to establish a service or for which a UE is paged, the eNB will be able to uniquely identify a specific Slice amongst the Slices served by the selected PLMN ID.

Hence, since a Slice ID only needs to be unique within its hosting PLMN, it is not necessary to coordinate Slice IDs across PLMNs but only within each PLMN. On the contrary, two Slice IDs hosted by different PLMNs may have the same slice ID. The eNB will be able to identify to which slice procedures are referring to, based on the PLMN ID and the Slice ID since the Slice ID would be unique within its own PLMN ID. Since no coordination of Slice IDs is necessary, the number of cross-PLMN configurations are reduced which saves costs and effort of running the networks.

It should be noted that the S1 SETUP RESPONSE may include an overall list of Slice IDs supported by the connected MME without an explicit association to PLMN IDs. However, this solution implies that the eNB would need to acquire knowledge of the Slice ID to PLMN ID association, for example by an Operations and Management (OAM) configuration.

When the wireless device 10 is located in its home network, such as the H-PLMN, and the H-PLMN comprises a set of functionalities belonging to a network slice, the wireless device may request service of the slice in the initial attach procedure by providing a slice ID of the H-PLMN during the RRC setup procedure, e.g. in the RRCConnectionSetupComplete message.

However, there will still be a problem with MME selection in a roaming scenario. In roaming scenario, a visited network, such as a V-PLMN, will be selected by the wireless device. According to existing solutions the wireless device 10 will send the slice ID it is aware of in the RRCConnectionSetupComplete message. However, this slice ID belongs to the wireless devices 10 H-PLMN and may not correspond to a slice ID in the V-PLMN capable of supporting the wireless device. Hence, according to this solution it is required to coordinate the slice IDs between the H-PLMN and the V-PLMN in order to give each network slice a unique identifier. Otherwise the network slice will not be selected correctly in the V-PLMN. With this additional requirement the slice ID is now required to be coordinated between H-PLMN, V-PLMNs and all PLMNs handled in the core network node 19, 20, such as an MME. It is obvious that this will require a lot of cross-PLMN configurations which, as already has been discussed, is very time consuming and cost intensive.

Figure 13:
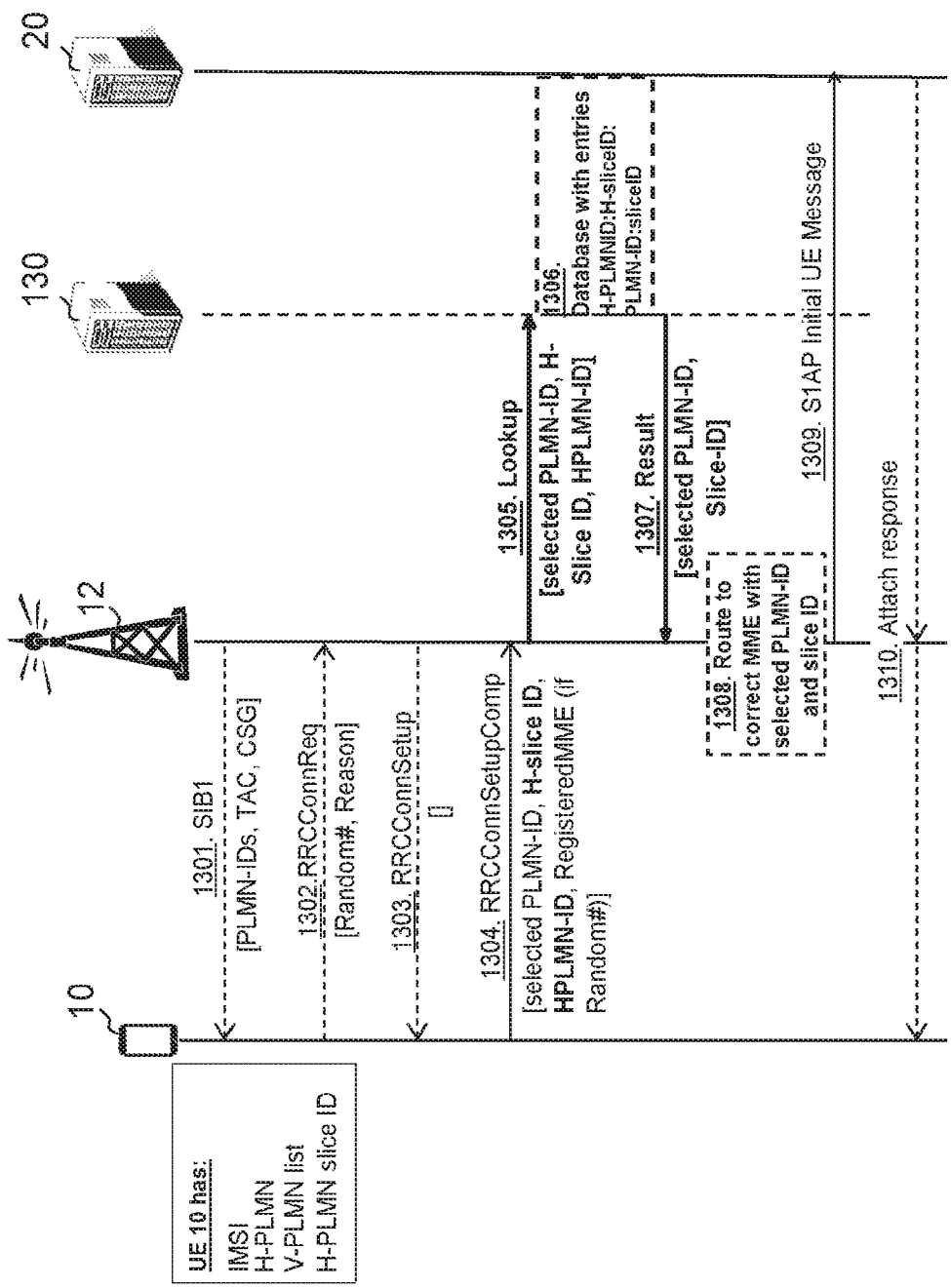
FIG. 13 signaling diagram depicting a service request procedure according to prior art.

Therefore, according to the second aspect of embodiments herein, which is shown in FIG. 13, a slice lookup DataBase (DB) 130, in which a mapping between slice IDs for the H-PLMN and the V-PLMNs is performed, is introduced. This DB 130 may e.g. be accessed from the eNB/RAN node 12 during the initial attach procedure to translate the combination of a HPLMN ID and a H-PLMN slice ID to a V-PLMN slice ID for core network node selection based on V-PLMN selected by the wireless device 10. FIG. 13 shows an example of this case. The result of this lookup may then be transmitted to the wireless device 10 for a later procedure, such as e.g. paging and/or service request procedures. Thereby, it may not be necessary for the RAN node 12 to perform a lookup in the database every time the wireless device sends a service request in the visited network it has once been attached to. During initial setup in the visited network, such as in a V-PLMN, however, the service request message is routed to the correct CN node based on the selected V-PLMN ID of the visited network and the V-slice ID retrieved from the DB by the RAN node.

Figure 14:
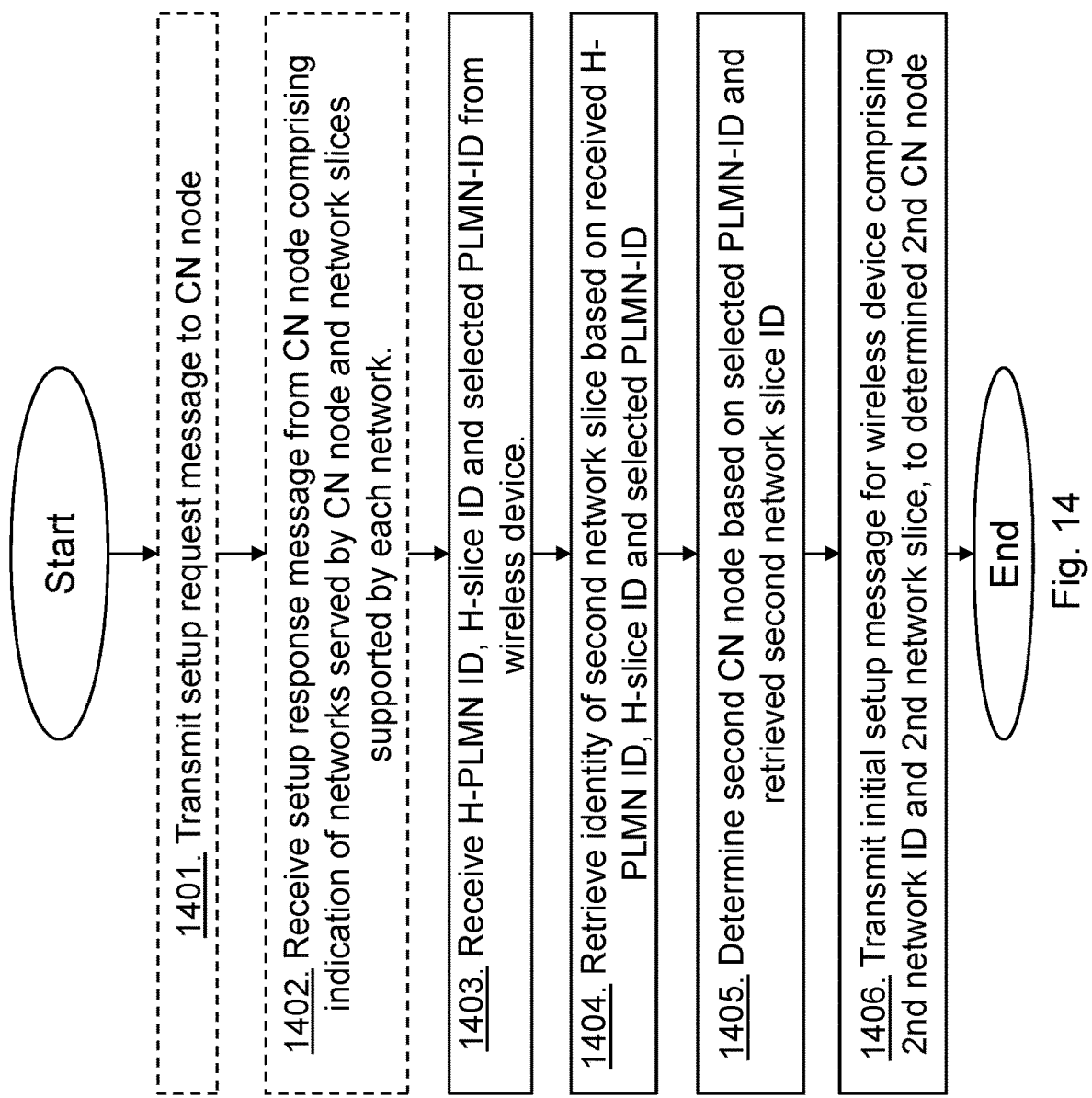
FIG. 14 is a schematic flowchart depicting a method performed by a RAN node according to embodiments herein.

The database may be located in a V-PLMN domain, since the responsibility for this database may be at the operator managing the V-PLMN, who can update the database continuously once agreements with partnering PLMNs is made without any other dependencies. For example, an operator of the slice supporting the wireless device in the H-PLMN, which may also be referred to as the H-Slice, may enter an agreement with an operator of one of the network slices in the V-PLMN. The operator managing the V-PLMN may enter into the lookup table in the database that the H-Slice in the H-PLMN has an agreement with, i.e. is supported by, a certain Slice ID in the V-PLMN. The service request procedure according to embodiments described herein is shown in FIG. 14, where the identifiers introduced in the embodiments herein are indicated with bold font. The Service Request initiated by the wireless device 10 according to the embodiments herein comprises the following actions:

Action 1301:

The RAN node may transmit a System Information Block 1 (SIB1) message to the wireless device 10, comprising an indication of the supported PLMN-IDs, a Tracking Area Code (TAC) and a Closed Subscriber Group (CSG) for assisting the wireless device 10 in evaluating a cell access.

Action 1302:

The wireless device 10 may initiate the setup request by transmitting a RRC Connection Request (RRCConnReq) to the RAN node 12 comprising the reason for the setup request and a.

Action 1303:

The RAN node 12 may transmit a RRC Connection Setup (RRCConnSetup) message to the wireless device 10 in response to the RRC Connection Request, which may comprise an indication of a configuration used for the connection with the wireless device 10.

Action 1304:

The wireless device 10 transmits a RRC Connection Setup Complete (RRCConnSetupComp) message to the RAN node 12, which message comprises an indication of the selected visited network, such as the selected PLMN-ID, an indication of the network slice supporting the wireless device in the home network, such as a H-slice ID, an indication of the H-PLMN of the wireless device 10, such as a H-PLMN ID.

Action 1305:

The RAN node 12 transmits the selected PLMN-ID for the visited network, the H-slice ID and the H-PLMN ID to the lookup DB 130, in order to retrieve a slice ID for a network slice supporting the wireless device 10 in the selected visited network.

Action 1306:

The DB 130 performs a lookup in a table comprising corresponding H-PLMN ID:H-slice ID:PLMN-ID:slice ID groups and retrieves a slice ID supporting the wireless device 10 in the selected PLMN based on the received selected PLMN-ID for the visited network, the H-slice ID and the H-PLMN ID to the lookup DB 130.

Action 1307:

The RAN node 12 receives a result from the DB 130 comprising the selected PLMN-ID indicating the selected visited network and a slice ID indicating the network slice in the visited network supporting the wireless device 10.

Action 1308:

The RAN node 12 determines the correct core network node 20, such as an MME, to route the Setup request to, based on the received selected PLMN-ID and the corresponding slice ID supporting the wireless device in the selected visited PLMN.

Action 1309:

The RAN node 12 transmits an initial setup message, such as a S1AP Initial UE message, to the determined core network node 20.

Action 1310:

The core network node 20 may transmit an attach response message to the wireless device 10 via the RAN node 12, which message comprises an indication of the second network slice supporting the wireless device 10. The indication of the network slice may be used by the wireless device 10 in future service requests triggered by the wireless device 10.

The method actions performed by the RAN node 12, for enabling connection setup for the wireless device 10 in the communication network 1 according to embodiments herein will now be described with reference to a flowchart depicted in FIG. 14. The actions do not have to be taken in the order stated below, but may be taken in any suitable order. Actions performed in some embodiments are marked with dashed boxes. The communication network 1 comprises a first network and a second network. The first network is a home network of the wireless device 10 and the second network is a network which is visited by the wireless device 10. The first and the second network each comprise partitioned sets of functionalities, which sets of functionalities each belong to a network slice of the network. A first set of functionalities in the first network belongs to a first network slice supporting the wireless device 10, which first set of functionalities is separated from another set of functionalities out of a total set of functionalities in the first network. The wireless device 10 is roaming from the first network to the second network.

The RAN node 12 may further be associated with a plurality of networks, wherein each network supports a plurality of network slices.

Action 1401:

The RAN node 12 may, when the RAN node is associated to a plurality of networks and each network supports a plurality of network slices, transmit a setup request message for establishing communication between the RAN node 12 and the core network node 19, 20, to a core network node 19, 20.

This action 1401 is similar to the action 1205 described above in relation to FIG. 12.

Action 1402:

The RAN node 12 may, when the RAN node is associated to a plurality of networks and each network supports a plurality of network slices, receive a setup response message comprising an indication of one or more networks served by the core network node 19, 20 and the network slices supported by each network served by the core network node 19, 20, from the core network node 19, 20.

This action 1402 is similar to the action 1206 described above in relation to FIG. 12.

Action 1403:

The RAN node 12 receives a first network identity for the home network, such as e.g. a H-PLMN ID, an identity of the first network slice supporting the wireless device in the home network, such as e.g. a H-slice ID, and a second network identity for the second network, such as e.g. a V-PLMN, from the wireless device 10.

This action 1403 is similar to the action 1304 described above in relation to FIG. 13.

Action 1404:

The RAN node 12 retrieves an identity of a second network slice capable of supporting the wireless device 10 in the second network, based on the received first network identity for the home network, the received first network slice identity supporting the wireless device 10 in the home network and the received second network identity for the second network visited by the wireless device 10.

The retrieving may comprise sending the received first network identity, the received first network slice identity and the received second network identity to a DataBase (DB) 130. The retrieving may further comprise receiving an identification of the second network slice capable of supporting the wireless device 10 in the second network, based on the first network identity, the first network slice identity and the second network identity from the DB 130. The DB 130 may e.g. be comprised in the RAN node or in a dedicated DB node 130 being connected to the RAN node via e.g. an S1 interface or an X2 interface. The DB 130 may further comprise a lookup table, where the identity of the home network for the wireless device 10, the first network slice identity supporting the wireless device 10 in the home network and the received second network identity for the second network visited by the wireless device 10 are entered as inputs to the lookup table and a slice ID supporting the wireless device 10 in the second network is received as output from the lookup table.

This action 1404 is similar to the actions 1305, 1306 and 1307 described above in relation to FIG. 13.

Action 1405:

The RAN node 12 determines a second core network node 20 based on the second, which may also be referred to as the selected, network identity, such as e.g. the V-PLMN ID, and the retrieved second network slice identity.

The determining may comprise comparing the received second network identity and the retrieved second network slice identity with the received indication of networks and network slices supported by the core network node 20.

This action 1405 is similar to the action 1308 described above in relation to FIG. 13.

Action 1406:

The RAN node 12 transmits an initial setup message for the wireless device 10, which initial setup message comprises an indication of the second network identity and the identity of the second network slice capable of supporting the wireless device 10, to the determined second core network node 20. The initial setup message may be transmitted over the S1 protocol.

This action 1406 is similar to the action 1309 described above in relation to FIG. 13.

It shall be noted that the action steps 1401 and 1402 may be performed separately, i.e. independently from the action steps 1403 to 1406 as a separate method for performing a S1 Setup procedure.

Figure 15:
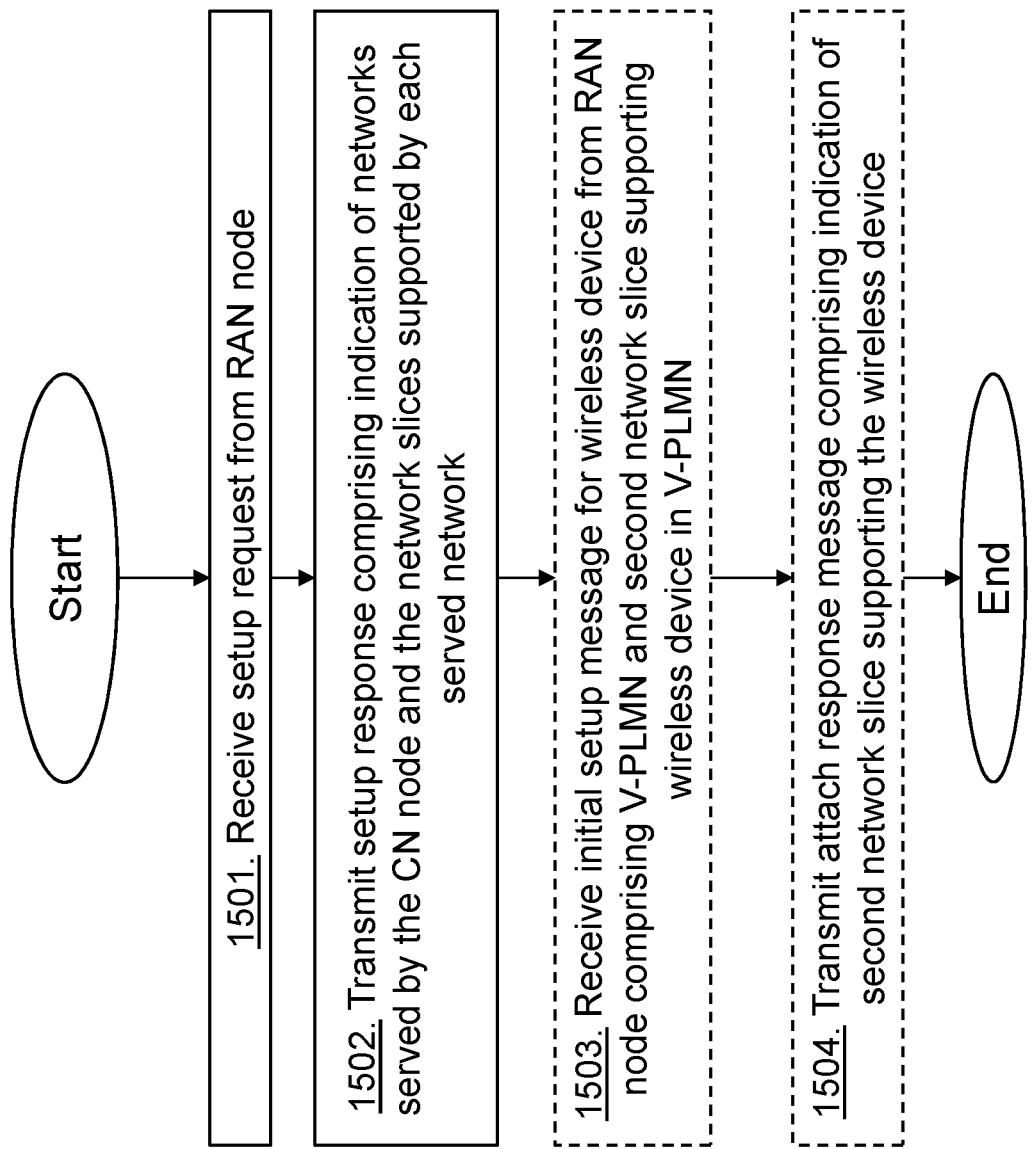
FIG. 15 is a schematic flowchart depicting a method performed by a core network node according to embodiments herein.

The method actions performed by the core network node 19, 20 for enabling connection setup for a wireless device 12 in a communication network 1 according to embodiments herein will now be described with reference to a flowchart depicted in FIG. 15. The actions do not have to be taken in the order stated below, but may be taken in any suitable order. Actions performed in some embodiments are marked with dashed boxes. The communication network 1 comprises at least a first network and a second network. The first and the second network each comprise partitioned sets of functionalities, which sets of functionalities each belong to a network slice of the network. The sets of functionalities are separated from each other.

The core network node 20 may be associated with the second network. The wireless device 10 is roaming from the first network to the second network.

Action 1501:

The core network node 19, 20 receives a setup request message for establishing communication between the RAN node 12 and the core network node 19, 20, from the RAN node 12. The setup request message may be transmitted over the S1 interface as e.g. an S1 SETUP REQUEST.

This action 1501 is similar to the action 1205 described above in relation to FIG. 12.

Action 1502:

The core network node 19, 20 transmits a setup response message comprising an indication of one or more networks served by the core network node 19, 20 and the network slices supported by each network served by the core network node 19, 20, to the RAN node 12. The network slices supported by each network may be presented as a list of Slice IDs for each network ID, such as e.g. a S-PLMN ID. The setup response message may be transmitted over the S1 interface as e.g. an S1 SETUP RESPONSE.

This action 1502 is similar to the action 1206 described above in relation to FIG. 12.

Action 1503:

The core network node 20 may receive an initial setup message for the wireless device 10, which initial setup message comprises an indication of a second network identity associated with the second network, such as e.g. a V-PLMN and an indication of a second network slice capable of supporting the wireless device 10 in the second network, from the RAN node 12.

This action 1503 is similar to the action 1309 described above in relation to FIG. 13.

Action 1504:

The core network node 20 may further transmit an attach response message comprising an indication of the second network slice supporting the wireless device 10, to the wireless device 10 via the RAN node 12. The indication of the network slice may be used by the wireless device 10 in future service requests triggered by the wireless device 10.

This action 1504 is similar to the action 1310 described above in relation to FIG. 13.

Figure 16:
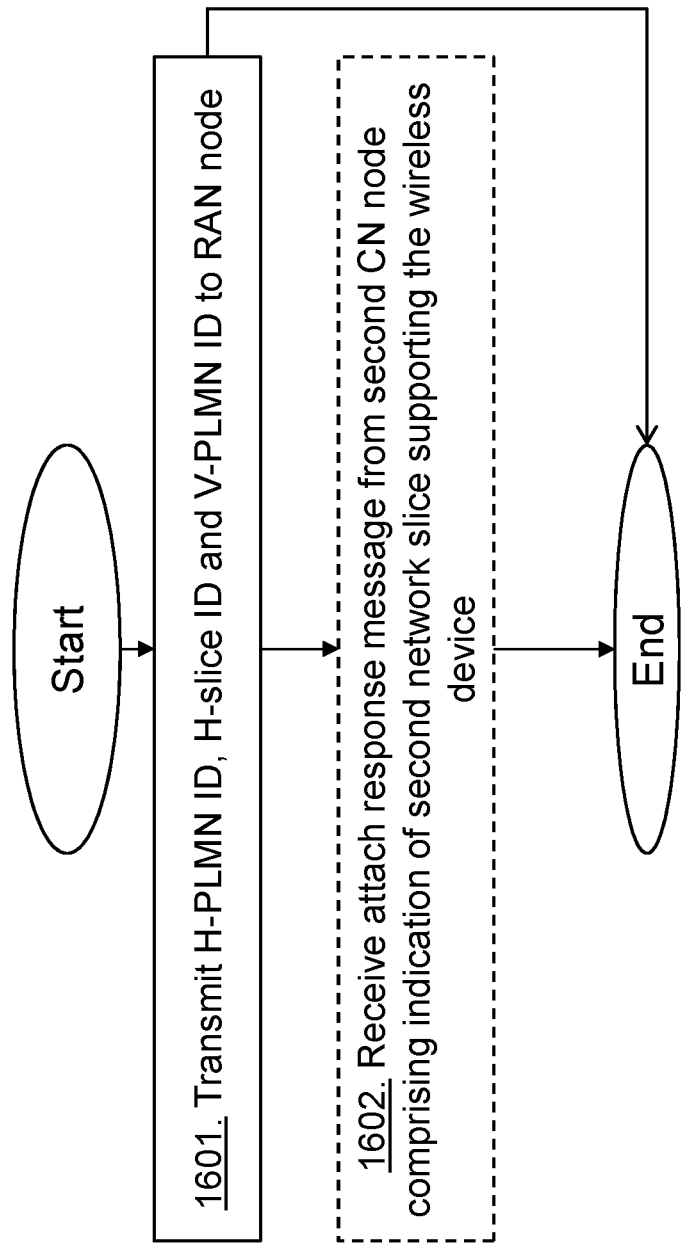
FIG. 16 is a schematic flowchart depicting a method performed by a wireless device according to embodiments herein.

The method actions performed by the wireless device 10 for establishing a connection setup second network in a communication network 1 according to embodiments herein will now be described with reference to a flowchart depicted in FIG. 16. The actions do not have to be taken in the order stated below, but may be taken in any suitable order. Actions performed in some embodiments are marked with dashed boxes. The communication network 1 comprises a first network and the second network, wherein the first network is a home network of the wireless device 10 and the second network is a network which is visited by the wireless device 10. The first and the second network each comprise partitioned sets of functionalities, which sets of functionalities each belong to a network slice of the network. A first set of functionalities in the first network belongs to a first network slice supporting the wireless device 10 in the first network. The first set of functionalities is separated from another set of functionalities out of a total set of functionalities in the first network. The wireless device 10 is roaming from the first network to the second network.

Action 1601:

The wireless device transmits a first network identity for the home network of the wireless device 10, such as e.g. a H-PLMN ID, an identity of the first network slice supporting the wireless device 10 in the home network, such as e.g. a H-slice ID, and a second network identity for the visited second network, such as e.g. a V-PLMN ID, to the RAN node 12. The transmission may be sent during a RRC Connection Setup Procedure, such as e.g. in a RRC Connection Setup Complete message.

This action 1601 is similar to the action 1304 described above in relation to FIG. 13.

Action 1602:

The wireless device 10 may further receive an attach response message comprising an indication of a second network slice supporting the wireless device 10 in the second network, from the second core network node 20. The indication of the network slice may be used by the wireless device 10 in future service requests triggered by the wireless device 10. The attach response message is transmitted from the core network node 20 to the wireless device 10 via the RAN node 12.

This action 1602 is similar to the action 1310 described above in relation to FIG. 13.

Figure 17:
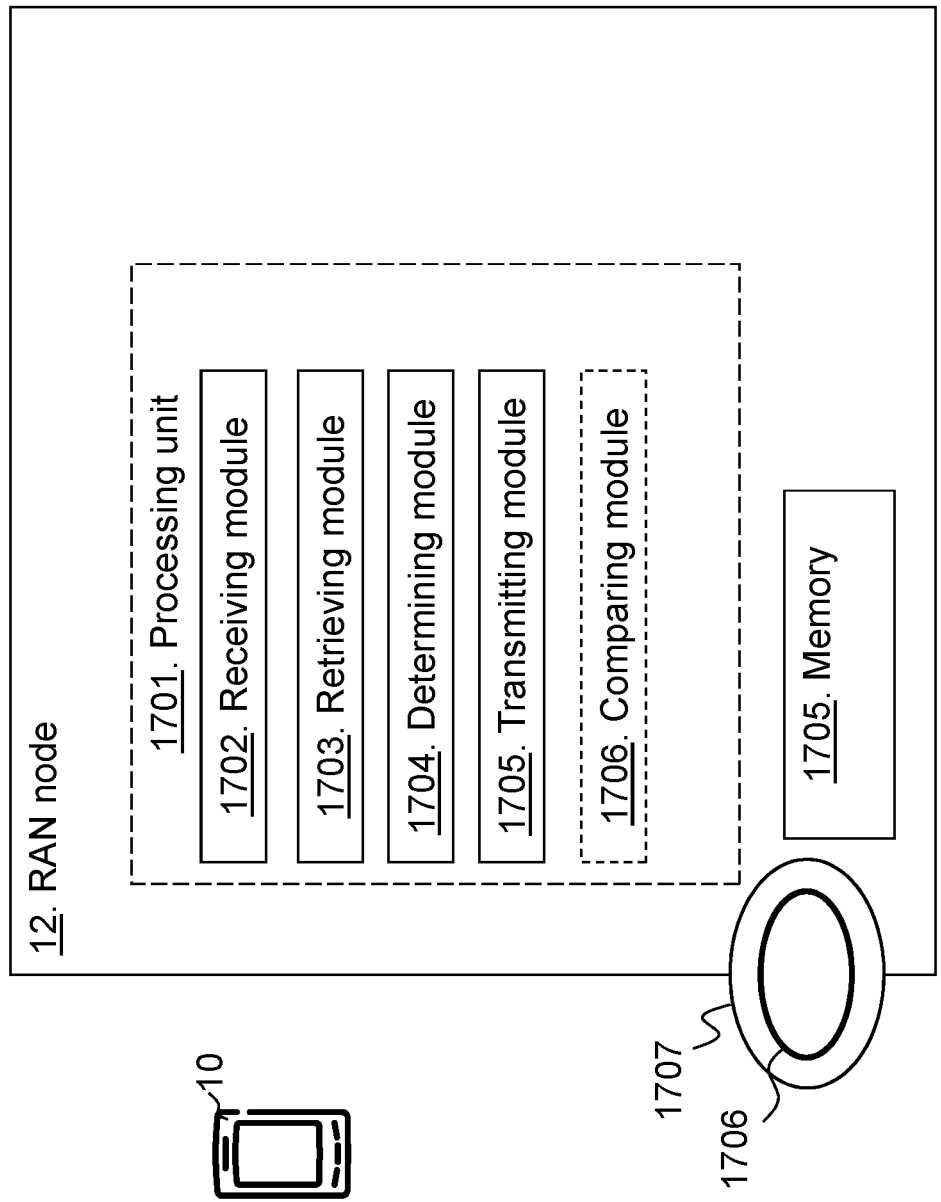
FIG. 17 is a block diagram depicting a RAN node according to embodiments herein.

FIG. 17 is a block diagram depicting the RAN node 12 for enabling connection setup for the wireless device 10 in the communication network 1. The communication network 1 comprises a first network and a second network. The first network is a home network of the wireless device 10 and the second network is a network which is visited by the wireless device 10. The first and the second network each comprise partitioned sets of functionalities, which sets of functionalities each belong to a network slice of the network. A first set of functionalities in the first network belongs to a first network slice supporting the wireless device 10, which first set of functionalities is separated from another set of functionalities out of a total set of functionalities in the first network. The wireless device is roaming from the first network to the second network. The RAN node 12 may further be associated with a plurality of networks, wherein each network supports a plurality of network slices. The RAN node 12 may comprise a processing unit 1701, e.g. one or more processors, configured to perform the methods described herein.

The RAN node 12 is configured to, e.g. by means of a receiving module 1702 and/or the processing unit 1701 being configured to, receive a first network identity for the home network, an identity of the first network slice supporting the wireless device in the home network and a second network identity for the second network from the wireless device 10.

The RAN node 12 is further configured to, e.g. by means of a retrieving module 1703 and/or the processing unit 1701 being configured to, retrieve an identity of a second network slice capable of supporting the wireless device 10 in the second network, based on the received first network identity, the first network slice identity and the second network identity.

The RAN node 12 may further be configured to retrieve the identity of the second network slice, by being configured to, e.g. by means of a transmitting module 1705 and/or the processing unit 1701 being configured to, send the received first network identity, the first network slice identity and the second network identity, to a DataBase, DB.

The RAN node 12 may further be configured to retrieve the identity of the second network slice, by being configured to, e.g. by means of the receiving module 1702 and/or the processing unit 1701 being configured to, receive from the DB an identification of the second network slice capable of supporting the wireless device 10 in the second network, based on the first network identity, the first network slice identity and the second network identity.

The RAN node 12 is further configured to, e.g. by means of a determining module 1704 and/or the processing unit 1701 being configured to, determine a core network node 20 based on the second network identity and the retrieved second network slice identity.

The RAN node 12 is further configured to, e.g. by means of the transmitting module 1705 and/or the processing unit 1701 being configured to, transmit an initial setup message for the wireless device 10, which initial setup message comprises an indication of the second network identity and the identity of the second network slice capable of supporting the wireless device 10, to the determined core network node 20.

The RAN node 12 may, when the RAN node 12 is associated with a plurality of networks and each network supports a plurality of network slices, further be configured to, e.g. by means of the transmitting module 1705 and/or the processing unit 1701 being configured to, transmit a setup request message for establishing communication between the RAN node 12 and the core network node 19, 20, to a core network node 19, 20.

The RAN node 12 may, when the RAN node 12 is associated with a plurality of networks and each network supports a plurality of network slices, further be configured to, e.g. by means of the receiving module 1702 and/or the processing unit 1701 being configured to, receive a setup response message comprising an indication of one or more networks served by the core network node 19, 20 and the network slices supported by each network served by the core network node 19, 20, from the core network node 19, 20.

The RAN node 12 is further configured to, e.g. by means of a comparing module 1706 and/or the determining module 1704 and/or the processing unit 1701 being configured to, compare the retrieved second network identity and the second network slice identity with the received indication of networks and network slices supported by the core network node 20 in order to determine the core network node 20.

The RAN node 12 further comprises a memory 1705. The memory comprises one or more units to be used to store data on, such as network slice information, wireless device IDs, network IDs, network slice and roaming policies, Slice IDs applications to perform the methods disclosed herein when being executed, and similar.

The methods according to the embodiments described herein for the RAN node 12 are respectively implemented by means of e.g. a computer program 1706 or a computer program product, comprising instructions, i.e., software code portions, which, when executed on at least one processor, cause the at least one processor to carry out the actions described herein, as performed by the RAN node 12. The computer program 1706 may be stored on a computer-readable storage medium 1707, e.g. a disc or similar. The computer-readable storage medium 1707, having stored thereon the computer program, may comprise the instructions which, when executed on at least one processor, cause the at least one processor to carry out the actions described herein, as performed by the RAN node 12. In some embodiments, the computer-readable storage medium may be a non-transitory computer-readable storage medium.

Figure 18:
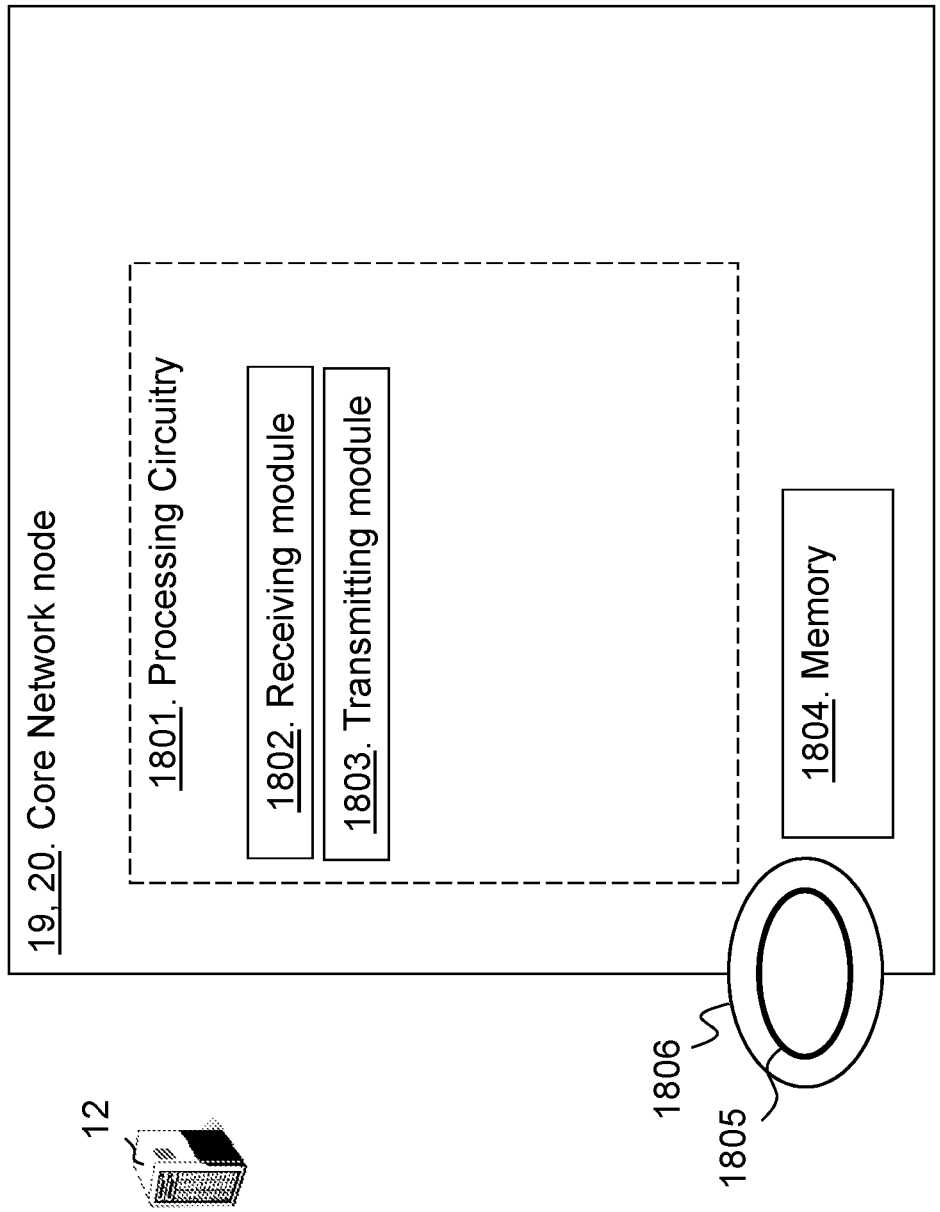
FIG. 18 is a block diagram depicting a core network node according to embodiments herein.

FIG. 18 is a block diagram depicting the core network node 19, 20 for enabling connection setup for the wireless device 10 in the communication network 1. The communication network 1 comprises at least a first network and a second network. The first and the second network each comprise partitioned sets of functionalities, which sets of functionalities each belong to a network slice of the network. The sets of functionalities are separated from each other. The wireless device 10 is roaming from the first network to the second network.

The core network node 20 may be associated with the second network. The core network node 19 may comprise a processing unit 1801, e.g. one or more processors, configured to perform the methods described herein.

The core network node 19 is configured to, e.g. by means of a receiving module 1802 and/or the processing unit 1801 being configured to, receive a setup request message for establishing communication between the RAN node 12 and the core network node 19, 20, from the RAN node 12.

The core network node 19 is configured to, e.g. by means of a transmitting module 1803 and/or the processing unit 1801 being configured to, transmit a setup response message comprising an indication of one or more networks served by the core network node 19, 20 and the network slices supported by each network served by the core network node 19, 20, to the RAN node 12.

The core network node 19 may further be configured to, e.g. by means of an receiving module 1802 and/or the processing unit 1801 being configured to, receive an initial setup message for the wireless device 10, which initial setup message comprises an indication of a second network identity associated with the second network and an indication of a second network slice capable of supporting the wireless device 10, from the RAN node 12.

The core network node 19 further comprises a memory 1804. The memory comprises one or more units to be used to store data on, such as network slice information, wireless device IDs, network slice and roaming policies, Slice IDs applications to perform the methods disclosed herein when being executed, and similar.

The methods according to the embodiments described herein for the core network node 19 are respectively implemented by means of e.g. a computer program 1805 or a computer program product, comprising instructions, i.e., software code portions, which, when executed on at least one processor, cause the at least one processor to carry out the actions described herein, as performed by the core network node 19. The computer program 1805 may be stored on a computer-readable storage medium 1806, e.g. a disc or similar. The computer-readable storage medium 1806, having stored thereon the computer program, may comprise the instructions which, when executed on at least one processor, cause the at least one processor to carry out the actions described herein, as performed by the core network node 19. In some embodiments, the computer-readable storage medium may be a non-transitory computer-readable storage medium.

Figure 19:
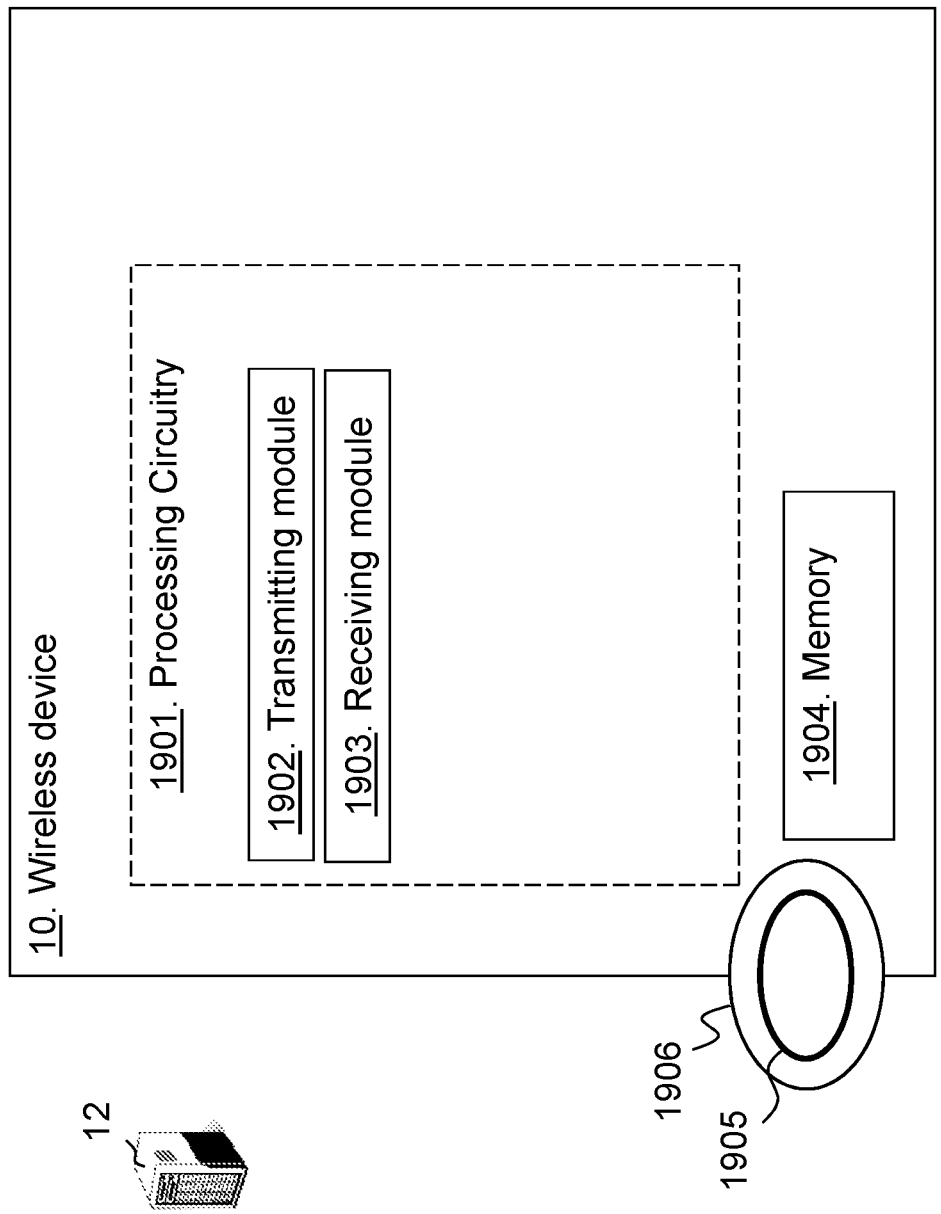
FIG. 19 is a block diagram depicting a wireless device according to embodiments herein.

FIG. 19 is a block diagram depicting the wireless device 10 for establishing a connection to a second network in a communication network 1. The communication network 1 comprises a first network and the second network, wherein the first network is a home network of the wireless device 10 and the second network is a network which is visited by the wireless device 10. The first and the second network each comprise partitioned sets of functionalities, which sets of functionalities each belong to a network slice of the network. A first set of functionalities in the first network belongs to a first network slice supporting the wireless device 10 in the first network. The first set of functionalities is separated from another set of functionalities out of a total set of functionalities in the first network. The wireless device 10 may comprise a processing unit 1901, e.g. one or more processors, configured to perform the methods described herein.

The wireless device 10 is configured to, e.g. by means of a transmitting module 1902 and/or the processing unit 1901 being configured to, transmit a first network identity for the home network of the wireless device 10, an identity of the first network slice supporting the wireless device 10 in the home network and a second network identity for the visited second network to the RAN node 12.

The wireless device 10 may further be configured to, e.g. by means of a receiving module 1903 and/or the processing unit 1901 being configured to, receive an attach response message comprising an indication of a second network slice supporting the wireless device 10 in the second network, from the second core network node 20. The indication of the network slice may be used by the wireless device 10 in future service requests triggered by the wireless device 10. The attach response message is transmitted from the core network node 20 to the wireless device 10 via the RAN node 12.

The wireless device 10 further comprises a memory 1904. The memory comprises one or more units to be used to store data on, such as network slice information, wireless device IDs, network slice and roaming policies, Slice IDs applications to perform the methods disclosed herein when being executed, and similar.

The methods according to the embodiments described herein for the wireless device 10 are respectively implemented by means of e.g. a computer program 1905 or a computer program product, comprising instructions, i.e., software code portions, which, when executed on at least one processor, cause the at least one processor to carry out the actions described herein, as performed by the wireless device 10. The computer program 1905 may be stored on a computer-readable storage medium 1906, e.g. a disc or similar. The computer-readable storage medium 1906, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Embodiments herein relate to a network with network slices i.e. a (core or RAN or both) network with partitioned sets of functionalities wherein the core network node 19, the wireless device 10 and/or the RAN node 12 may support the first set of functionalities out of the total set of functionalities in the network of the communication network. The first set of functionalities belongs to the first network slice of the network, and is separated from another set of functionalities out of the total set of functionalities in the network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a Radio Access Network (RAN) node, for enabling connection setup for a wireless device in a communication network, which communication network comprises a first network and a second network, wherein the first network is a home network of the wireless device and the second network is a network which is visited by the wireless device, and wherein the first network and the second network each comprise partitioned sets of functionalities, which sets of functionalities each belong to a network slice of the network, wherein a first set of functionalities in the first network belongs to a first network slice supporting the wireless device, and which first set of functionalities is separated from another set of functionalities out of a total set of functionalities in the first network, wherein the wireless device is roaming from the first network to the second network, the method comprising:

receiving, from the wireless device, a first network identity for the home network, an identity of the first network slice supporting the wireless device in the home network and a second network identity for the second network;

retrieving an identity of a second network slice capable of supporting the wireless device in the second network, based on the received first network identity, the first network slice identity and the second network identity;

determining a second core network node based on the second network identity and the retrieved second network slice identity; and transmitting, to the determined second core network node, an initial setup message for the wireless device, which initial setup message comprises an indication of the second network identity and the identity of the second network slice capable of supporting the wireless device;

wherein retrieving the identity of the second network slice comprises sending, to a data base (DB) the received first network identity, the first network slice identity and the second network identity, and receiving from the DB an identification of the second network slice capable of supporting the wireless device in the second network, based on the first network identity, the first network slice identity and the second network identity.

2. The method according to claim 1, wherein the RAN node is associated with a plurality of networks and wherein each network of the plurality of networks supports a plurality of network slices, wherein the method further comprises:

transmitting, to a core network node, a setup request message for establishing communication between the RAN node and the core network node; and receiving, from the core network node, a setup response message comprising an indication of one or more networks served by the core network node and the network slices supported by each network served by the core network node.

3. The method according to claim 2, wherein the determining comprises comparing the retrieved second network identity and the second network slice identity with the received indication of networks and network slices supported by the core network node.

4. A Radio Access Network (RAN) node for enabling connection setup for a wireless device in a communication network, which communication network comprises a first network and a second network, wherein the first network is a home network of the wireless device and the second network is a network which is visited by the wireless device, and wherein the first network and the second network each comprise partitioned sets of functionalities, which sets of functionalities each belong to a network slice of the network, wherein a first set of functionalities in the first network belongs to a first network slice supporting the wireless device, and which first set of functionalities is separated from another set of functionalities out of a total set of functionalities in the first network, wherein the wireless device is to roam from the first network to the second network, the RAN node comprising:

a processor; and a memory containing instructions which, when executed by the processor, instructs the RAN node to perform operations to:

receive, from the wireless device, a first network identity for the home network, an identity of the first network slice supporting the wireless device in the home network and a second network identity for the second network;

retrieve an identity of a second network slice capable of supporting the wireless device in the second network, based on the received first network identity, the first network slice identity and the second network identity;

determine a core network node based on the second network identity and the retrieved second network slice identity; and transmit, to the determined core network node, an initial setup message for the wireless device, which initial setup message comprises an indication of the second network identity and the identity of the second network slice capable of supporting the wireless device, wherein the RAN node, in order to retrieve the identity of the second network slice, performs operations to send, to a database (DB) the received first network identity, the first network slice identity and the second network identity, and receive from the DB an identification of the second network slice capable of supporting the wireless device in the second network, based on the first network identity, the first network slice identity and the second network identity.

5. The RAN node according to claim 4, wherein the RAN node is associated with a plurality of networks and wherein each network of the plurality of networks supports a plurality of network slices, wherein the RAN node further performs operations to:

transmit, to a core network node, a setup request message for establishing communication between the RAN node and the core network node; and receive, from the core network node, a setup response message comprising an indication of one or more networks served by the core network node and the network slices supported by each network served by the core network node.

6. The RAN node according to claim 5, wherein the RAN node further performs operations to compare the retrieved second network identity and the second network slice identity with the received indication of networks and network slices supported by the core network node in order to determine the core network node.

7. A non-transitory computer-readable storage medium, having stored thereon a computer program comprising instructions which, when executed on at least one processor, cause a Radio Access Network (RAN) node, for enabling connection setup for a wireless device in a communication network, which communication network comprises a first network and a second network, wherein the first network is a home network of the wireless device and the second network is a network which is visited by the wireless device, and wherein the first network and the second network each comprise partitioned sets of functionalities, which sets of functionalities each belong to a network slice of the network, wherein a first set of functionalities in the first network belongs to a first network slice supporting the wireless device, and which first set of functionalities is separated from another set of functionalities out of a total set of functionalities in the first network, wherein the wireless device is roaming from the first network to the second network, to perform operations comprising:

receiving, from the wireless device, a first network identity for the home network, an identity of the first network slice supporting the wireless device in the home network and a second network identity for the second network;

retrieving an identity of a second network slice capable of supporting the wireless device in the second network, based on the received first network identity, the first network slice identity and the second network identity;

determining a second core network node based on the second network identity and the retrieved second network slice identity; and transmitting, to the determined second core network node, an initial setup message for the wireless device, which initial setup message comprises an indication of the second network identity and the identity of the second network slice capable of supporting the wireless device;

wherein the retrieving the identity of the second network slice comprises sending, to a database (DB) the received first network identity, the first network slice identity and the second network identity, and receiving from the DB an identification of the second network slice capable of supporting the wireless device in the second network, based on the first network identity, the first network slice identity and the second network identity.

8. The non-transitory computer-readable storage medium according to claim 7, wherein the RAN node further is associated with a plurality of networks and wherein each network of the plurality of networks supports a plurality of network slices, and wherein the instructions further cause the RAN node to perform operations comprising:

transmitting, to a core network node, a setup request message for establishing communication between the RAN node and the core network node; and receiving, from the core network node, a setup response message comprising an indication of one or more networks served by the core network node and the network slices supported by each network served by the core network node.

9. The non-transitory computer-readable storage medium according to claim 8, wherein the determining comprises comparing the retrieved second network identity and the second network slice identity with the received indication of networks and network slices supported by the core network node.

* * * * *